US012477462B2

(12) United States Patent
Kovács et al.

(10) Patent No.: US 12,477,462 B2
(45) Date of Patent: Nov. 18, 2025

(54) TRANSITION CONTROL BETWEEN RADIO RESOURCE CONTROL STATES

(71) Applicant: Telefonaktiebolaget LM Ericsson (publ), Stockholm (SE)

(72) Inventors: László Kovács, Martonvásár (HU); Gábor Magyar, Dunaharaszti (HU); Attila Báder, Paty (HU); Carlota Villasante Marcos, Madrid (ES); Miguel Angel Puente Pestaña, Madrid (ES); Juan-Mario Martin-Sanchez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 540 days.

(21) Appl. No.: 17/910,208

(22) PCT Filed: Jul. 30, 2020

(86) PCT No.: PCT/EP2020/071517
§ 371 (c)(1),
(2) Date: Sep. 8, 2022

(87) PCT Pub. No.: WO2021/180340
PCT Pub. Date: Sep. 16, 2021

(65) Prior Publication Data
US 2023/0092788 A1 Mar. 23, 2023

(30) Foreign Application Priority Data
Mar. 11, 2020 (EP) .................................... 20382174

(51) Int. Cl.
H04W 76/27 (2018.01)
H04W 52/02 (2009.01)

(52) U.S. Cl.
CPC ..... *H04W 52/0225* (2013.01); *H04W 52/0258* (2013.01); *H04W 76/27* (2018.02)

(58) Field of Classification Search
CPC ............. H04W 52/0225; H04W 76/27; H04W 52/0258
See application file for complete search history.

(56) References Cited

U.S. PATENT DOCUMENTS 9,225,759 B2 12/2015 Vannithamby et al.
2014/0064134 A1 3/2014 Huang et al.
(Continued)

FOREIGN PATENT DOCUMENTS

EP 2725852 A1 4/2014
WO 2019138883 A1 7/2019

OTHER PUBLICATIONS

3GPP, "3GPP TS 23.501 V16.4.0", 3rd Generation Partnership Project; Technical Specification Group Services and System Aspects; System architecture for the 5G System (5GS); Stage 2 (Release 16), Mar. 2020, 1-430.
(Continued)

Primary Examiner — Noel R Beharry
(74) Attorney, Agent, or Firm — Murphy, Bilak & Homiller, PLLC

(57) ABSTRACT

A technique of triggering transition control between different RRC states of wireless terminal devices is described. A method aspect of this technique comprises receiving a request for an RRC state transition control for a terminal device, wherein the request includes at least one identifier associated with the terminal device. The method further comprises obtaining a temporal inactivity parameter associated with the at least one identifier, wherein the temporal inactivity parameter depends on an estimated period of time between two traffic activities of the terminal device. Further still, the method comprises triggering, based on the temporal
(Continued)

inactivity parameter or a parameter derived on the basis of the temporal inactivity parameter, the RRC state transition control for the terminal device.

18 Claims, 17 Drawing Sheets

(56) References Cited

U.S. PATENT DOCUMENTS

| | | | |
|---|---|---|---|
| 2016/0302153 A1* | 10/2016 | Martin | H04W 76/28 |
| 2018/0227872 A1* | 8/2018 | Li | H04W 8/02 |
| 2019/0297148 A1* | 9/2019 | Zong | H04W 36/13 |

OTHER PUBLICATIONS

3GPP, "3GPP TS 38.300 V16.1.0", 3rd Generation Partnership Project; Technical Specification Group Radio Access Network; NR; NR and NG-RAN Overall Description; Stage 2 (Release 16), Mar. 2020, 1-133.

3GPP, "3GPP TS 38.331 V16.0.0", 3rd Generation Partnership Project; Technical Specification Group Radio Access Network; NR; Radio Resource Control (RRC) protocol specification (Release 16), Mar. 2020, 1-835.

Ericsson, "Handling of inactive UEs", 3GPP TSG-RAN WG2 #94, Tdoc R2-163998, Nanjing, P.R. China, May 23-27, 2016, 1-6.

* cited by examiner

TRANSITION CONTROL BETWEEN RADIO RESOURCE CONTROL STATES

TECHNICAL FIELD

The present disclosure generally relates to radio resource control (RRC). In more detail, a technique for controlling RRC state transitions is described. The technique can be implemented in the form of apparatuses, methods, a computer program product, and a system.

BACKGROUND

RRC is an important feature of wireless communication networks such as those standardized by the 3rd Generation Partnership Project (3GPP). Typical RRC functions include connection establishment and release, broadcast of system information, radio bearer establishment, reconfiguration and release, mobility-related procedures, and outer loop power control.

RRC is typically implemented on the basis of a state machine. The state machine defines different RRC states that can be assumed by a terminal device as well as allowable transitions between those states. The different RRC states have different amounts of radio resources associated with them for use by the terminal device in a given state. Since different amounts of resources are available in different RRC states, RRC state control influences, for example, energy consumption of the terminal device.

In fourth generation (4G) wireless communication networks, such as those conforming to the Long Term Evolution (LTE) standard, a terminal device can transition between a power-saving RRC state in which no data transmission is possible (the so-called IDLE state) and a power-intensive RRC state optimized for data transmission (the so-called CONNECTED state). For fifth generation (5G) wireless communication networks, also called New Radio (NR) networks, a third RRC state has been defined, the so-called INACTIVE state. In regard to its power consumption level, the INACTIVE state is located between the IDLE state and the CONNECTED state.

FIG. 1 illustrates an NR/5G RRC state machine with the associated states, namely the CONNECTED state, the IDLE state and the INACTIVE state, in accordance with Sect. 4.2.1 of 3GPP Technical Specification (TS) 38.331 V15.8.0 (2020-01).

As shown in FIG. 1, a terminal device can be triggered via RRC "release" signaling to transit to the IDLE state either from the CONNECTED state directly or from the INACTIVE state. The terminal device can transit to the CONNECTED state either from the IDLE state (via RRC "establish" signaling) or the INACTIVE state (via RRC "resume" signaling). Finally, the terminal device can by triggered via RRC "release with suspend" signaling to transit from the CONNECTED state to the IDLE state. As also shown in FIG. 1, there is no transition from the IDLE state to the INACTIVE state.

A transition from the INACTIVE state to the CONNECTED state requires less signaling between the terminal device and the network (and within the network) compared to a transition from the IDLE state to the CONNECTED state. The transition to the CONNECTED state from the INACTIVE state, therefore, introduces less latency compared to a transition from the IDLE state, while still providing power savings for the terminal device compared to the CONNECTED state.

As such, the INACTIVE state is a key enabler for use cases that require a low latency and low power consumption. At the same time, the reduced signaling overhead associated with the transition from the INACTIVE state to the CONNECTED state decreases the processing load on the network, so that the overall network capacity increases.

To reduce signaling even further, one may configure the terminal device to autonomously transit from the CONNECTED state to the INACTIVE state or the IDLE state, or from the INACTIVE state to the IDLE state. Such an autonomous transition can be controlled by a suitably-configured timer in the terminal device. The transition takes place upon expiry of the timer.

For the reasons set forth above, RRC state transition control is an important feature of wireless communication networks.

SUMMARY

There is a need for a transition control between RRC states that further improves RRC efficiency.

According to a first aspect, a method of triggering transition control between different RRC states of wireless terminal devices is provided. The method comprises receiving a request for an RRC state transition control for a terminal device, wherein the request includes at least one identifier associated with the terminal device. The method further comprises obtaining a temporal inactivity parameter associated with the at least one identifier, wherein the temporal inactivity parameter depends on an estimated period of time between two traffic activities of the terminal device. Further still, the method comprises triggering, based on the temporal inactivity parameter or a parameter derived on the basis of the temporal inactivity parameter, the RRC state transition control for the terminal device.

In one implementation, the request is received in the context of a current traffic activity of the terminal device. For example, the request is received in the context of the terminal device having started, or requested start of, the current traffic activity (e.g., a new end-to-end communication session). In this implementation, the RRC state transition control may be triggered in anticipation of a next traffic activity of the terminal device. For example, the RRC state transition control may be triggered such that the terminal device is prevented from transiting, before the anticipated next traffic activity, to an RRC state associated with a lower power consumption level (and higher latency) than the current RRC state. Such a prevention may increase RRC efficiency in certain scenarios.

The temporal inactivity parameter, or the parameter derived on the basis of the temporal inactivity parameter, may thus depend on an estimated period of time between (e.g., end of) the current traffic activity and (e.g., start of) the immediately next traffic activity. For example, the temporal inactivity parameter, or the parameter derived on the basis of the temporal inactivity parameter, may be indicative of the estimated period of time between end of the current traffic activity and start of the immediately next traffic activity, plus a predefined safety margin. The safety margin may, for example, extend the estimated period of time beyond the anticipated next traffic activity. The safety margin may in some variants help to reliably prevent a transition to an RRC state associated with a lower power consumption level (and higher latency) than the current RRC state shortly before the anticipated next traffic activity.

As such, the RRC state transition control can be performed for a transition from a first RRC state associated with a higher power consumption level to a second RRC state associated with a lower power consumption level. In particular, such a transition can selectively be prevented in case a transition in the opposite direction is estimated to occur in view of the next traffic activity already being anticipated.

In some cases, the RRC states include, in increasing order of the associated power consumption level, an IDLE state, an INACTIVE state, and a CONNECTED state. Here, the RRC state transition control may be performed for a transition from the INACTIVE state (the first state) to the IDLE state (the second state). In some variants, such a transition may selectively be prevented by the RRC state transition control, as explained above.

In certain variants, triggering the RRC state transition control may comprise controlling setting of an RRC state transition timing mechanism for the terminal device based on the temporal inactivity parameter, or the parameter derived on the basis of the temporal inactivity parameter. Such a setting may be triggered by transmitting the temporal inactivity parameter, or the parameter derived on the basis of the temporal inactivity parameter, to a network node capable of configuring that setting at the terminal device, or it may be transmitted to the terminal device directly.

The RRC state transition timing mechanism may govern a transition from the first RRC state to the second RRC state. The RRC state transition timing mechanism may be implemented using a timer installed on the terminal device. The timer may be configured to be started at the end of a particular traffic activity. Upon expiry of the timer, the transition from the first RRC state to the second RRC state may occur.

For example, triggering the RRC state transition control may comprise transmitting the temporal inactivity parameter, or the parameter derived on the basis of the temporal inactivity parameter, to a network node in charge of performing the RRC state transition control (e.g., by setting the RRC state transition timing mechanism for the terminal device based on the temporal inactivity parameter, or the parameter derived on the basis of the temporal inactivity parameter). The network node in charge of performing the RRC state transition control may be an access network node capable of serving the terminal device.

In some implementations, the parameter derived on the basis of the temporal inactivity parameter is obtained by modifying the temporal inactivity parameter. The temporal inactivity parameter may be modified taking into account one or more of the following constraints: regularly occurring traffic activities per at least one identifier, network signaling costs, network load, terminal device type, current RRC state of the terminal device, target RRC state of the terminal device, mobility of the terminal device. If the temporal inactivity parameter is directly indicative of the estimated period between two traffic activities of the terminal device, the modification may, for example, result in either shorting or extending the estimated period of time.

The method may also comprise analyzing the temporal activity parameter with respect to one or more alternative parameters using a cost function. The one or more alternative parameters may comprise one or more default parameters (e.g., a network-wide setting of the RRC state transition timing mechanism). The parameter derived on the basis of the temporal inactivity parameter may then be obtained as a result of the cost function analysis In such a case, the result of the cost function analysis may favor an alternative parameter that replaces the temporal activity parameter.

The method of triggering transition control between different RRC states of wireless terminal devices may be performed in at least one of a core network and an operations support system (OSS). In some variants, certain aspects of the method are performed in the core network, and other aspects are performed in the OSS. The core network and the OSS may belong to a wireless (e.g., mobile) communication network conforming, for example, to a 4G or NR/5G 3GPP specification.

In some cases, the request may include auxiliary information associated with the current traffic activity of the terminal device. Consequently, the temporal inactivity parameter can also be determined based on the auxiliary information. The auxiliary information may include at least one parameter selected from the parameter group comprising time of the day, day of the week, date, terminal device type, geographic location associated with the terminal device.

Determining the temporal inactivity parameter may comprise accessing an inactivity pattern database to obtain, based at least on the at least one identifier, the temporal inactivity parameter. The inactivity pattern database may be configured to enable selection among different temporal inactivity parameters stored for the at least one identifier dependent on the auxiliary information. As an example, different temporal inactivity parameters may be obtained for the same at least one identifier when the associated RRC state transition control requests are associated with different times of the day or different days of the week.

According to a second aspect, a method of determining temporal inactivity parameters for controlling transitions between different RRC states of wireless terminal devices is provided. The method comprises obtaining activity data sets for individual traffic activities of a plurality of terminal devices, wherein each activity data set includes, or permits to derive, at least the following parameters: a time stamp of the traffic activity; a duration of the traffic activity; and at least one identifier associated with the terminal device for which the activity data set has been created. The method further comprises analyzing the activity data sets to determine a temporal inactivity pattern per at least one identifier, wherein the inactivity pattern comprises at least one temporal inactivity parameter that depends on an estimated period of time between two traffic activities of the terminal device. Further still, the method comprises storing the inactivity pattern per at least one identifier in an inactivity pattern database to be accessible per the at least one identifier for RRC state transition control.

The time stamps (e.g., time of the day and date), the traffic activity durations and the associated terminal device identifiers may be processed to estimate the duration between two successive traffic activities per at least one identifier. As an example, the estimated period of time may be indicative of end of one traffic activity and start of the immediately next traffic activity. Many such periods of time may be estimated per at least one identifier from many activity data sets, and the estimated periods of time may substantially be similar or different.

The activity data sets may have been generated from traffic activities in the form of end-to-end communication sessions involving the plurality of terminal devices. For each such communication session, one or more activity data sets may have been created.

The temporal inactivity parameter may depend on the estimated period of time between end of one traffic activity and start of the immediately next traffic activity. The corresponding safety margin mentioned above may already be included in the temporal inactivity parameter stored in the inactivity pattern database. Alternatively, the temporal inactivity parameter as retrieved from the inactivity pattern database may be processed based on the safety margin so as to derive another parameter from the temporal inactivity parameter.

At least some of the activity data sets may further include auxiliary information associated with the particular traffic activity. The auxiliary information may take the form of at least one parameter selected from the parameter group comprising time of the day, day of the week, date, terminal device type, geographic location associated with the terminal device. Consequently, the inactivity pattern per at least one identifier may comprise multiple temporal inactivity parameters associated with different auxiliary information parameters per at least one identifier (e.g., different device types or different geographic locations).

The method may further comprise comparing an actual period of time between two traffic activities of a particular terminal device with an estimated period of time as defined by the temporal inactivity parameter, or a parameter derived on the basis of the temporal inactivity parameter, as determined for the associated RRC state transition control for the particular terminal device. The associated temporal inactivity pattern may then be modified based on a result of the comparison. In this way, a feedback loop can be created that increases precision of the temporal inactivity parameters in the inactivity pattern database.

In some implementations, the activity data sets are continuously obtained and analyzed in an operational phase of a communication network comprising the terminal devices. In this way, the inactivity pattern database can continuously be updated, and the temporal inactivity patterns can continuously be modified.

Analyzing the activity data sets to determine the temporal inactivity pattern per at least one identifier (and, optionally, per at least one auxiliary information parameter) in some variants comprises accumulating a distribution of inactivity periods per at least one identifier (and, optionally, per at least one auxiliary information parameter). In such variants, the at least one temporal inactivity parameter per at least one identifier (and, optionally, per at least one auxiliary information parameter) may be determined from the resulting distribution.

Also provided is a computer program product comprising program code portions to perform the method presented herein when executed on a processor. The computer program product may be stored on a computer-readable recording medium.

Further, an apparatus for triggering transition control between different RRC states of wireless terminal devices is provided. The apparatus is configured to receive a request for an RRC state transition control for a terminal device, wherein the request includes at least one identifier associated with the terminal device, to obtain a temporal inactivity parameter associated with the at least one identifier, wherein the temporal inactivity parameter depends on an estimated period of time between two traffic activities of the terminal device, and to trigger, based on the temporal inactivity parameter or a parameter derived on the basis of the temporal inactivity parameter, the RRC state transition control for the terminal device.

The apparatus for triggering transition control between different RRC states may be configured to perform the method according to the first aspect.

Further still, an apparatus for determining temporal inactivity parameters for controlling transitions between different RRC states of wireless terminal devices is provided. The apparatus is configured to obtain activity data sets for individual traffic activities of a plurality of terminal devices, wherein each activity data set includes, or permits to derive, at least the following parameters: a time stamp of the traffic activity; a duration of the traffic activity; and at least one identifier associated with the terminal device for which the activity data set has been created. The apparatus is further configured to analyze the activity data sets to determine a temporal inactivity pattern per at least one identifier, wherein the inactivity pattern comprises at least one temporal inactivity parameter that depends on an estimated period of time between two traffic activities of the terminal device, and to store the inactivity pattern per at least one identifier in an inactivity pattern database to be accessible per the at least one identifier for RRC state transition control.

The apparatus for determining temporal inactivity parameters may be configured to perform the method according to the second aspect.

Also provided is a system (e.g., an operations and support system, OSS) comprising the apparatus for determining temporal inactivity parameters and the apparatus for triggering, based on the temporal inactivity parameters, transition control between different RRC states.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
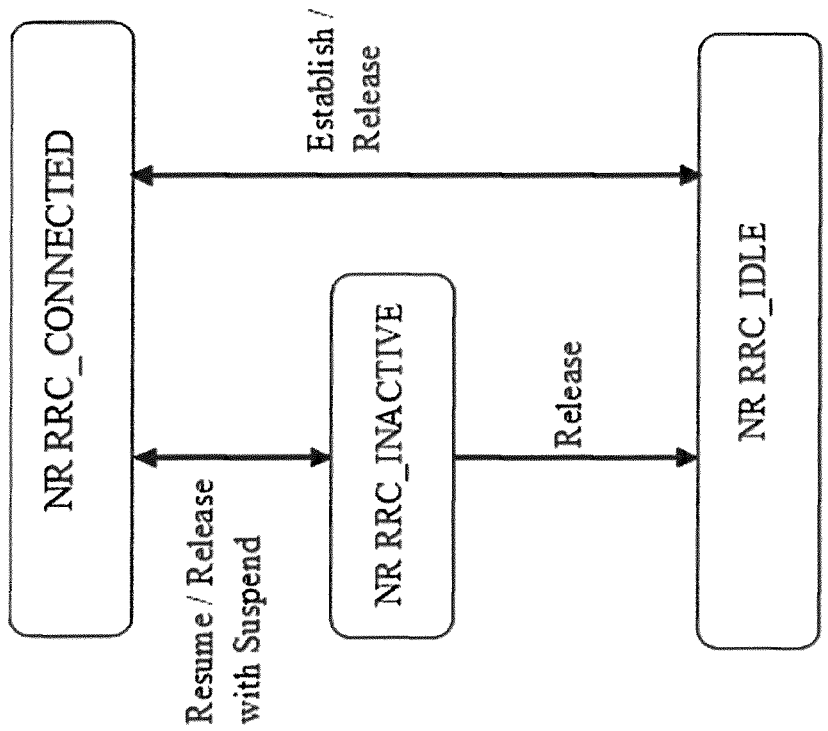
FIG. 1 is a diagram illustrating an NR/5G state machine as usable in the context of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, some embodiments of the following description focus on an exemplary core network configuration in accordance with NR/5G specifications, the present disclosure is not limited in this regard. The present disclosure could also be implemented in other cellular or non-cellular wireless communication networks, such as those complying with 4G specifications.

Those skilled in the art will further appreciate that the steps, services and functions explained herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

Figure 2:
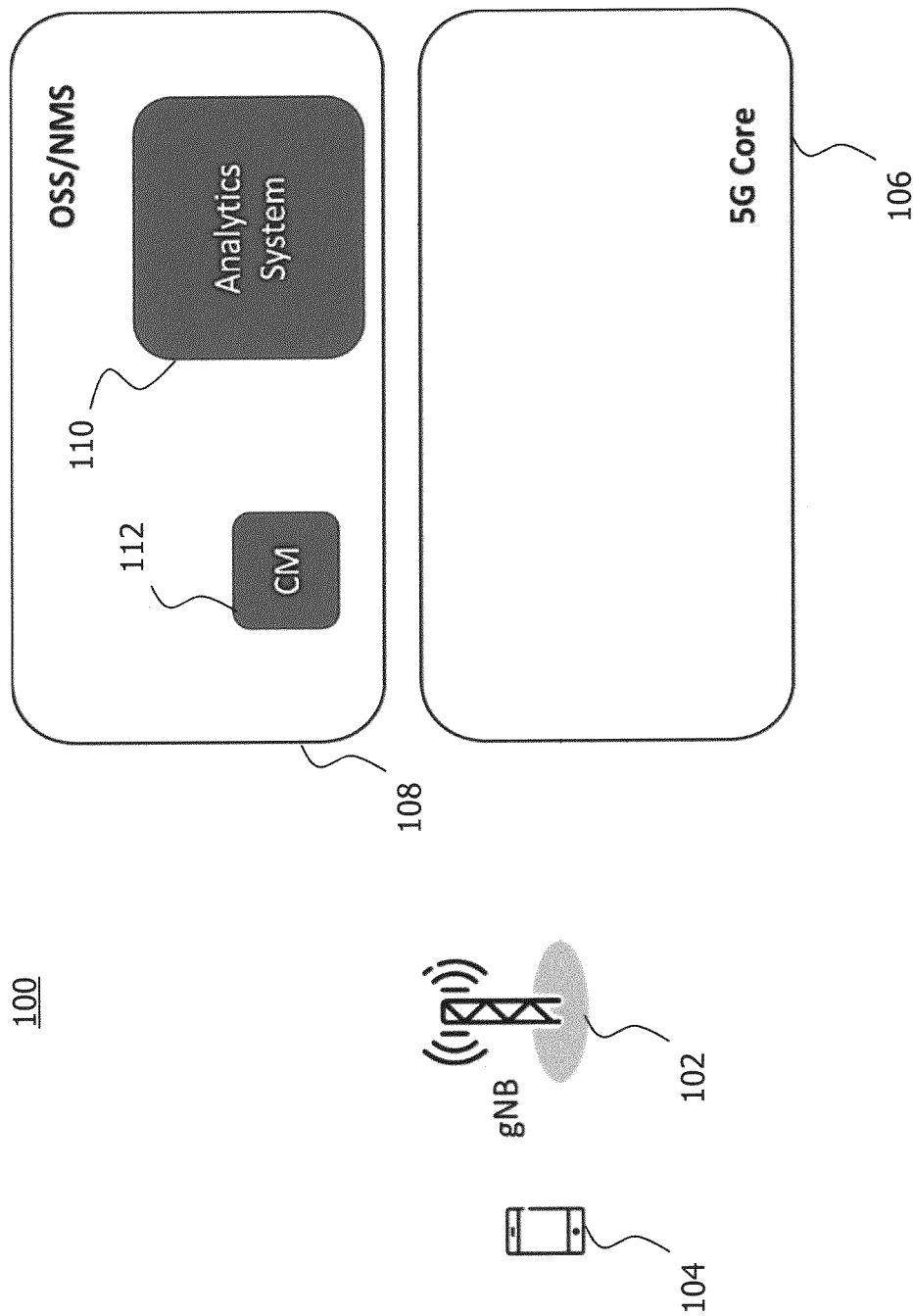
FIG. 2 is a diagram illustrating a NR/5G network system embodiment of the present disclosure.

FIG. 2 illustrates an embodiment of a NR/5G network system 100 in which the present disclosure can be implemented. As shown in FIG. 2, the network system 100 comprises at least one radio access network 102 serving at least one wireless terminal device 104. The one or more terminal devices 104 served by the radio access network 102 can be implemented as mobile or stationary devices, such as mobile telephones, Internet of Things (IoT) devices (e.g., smart devices or connected cars), and so on. The radio access network 102 includes one or more base station nodes, also called next generation nodeBs (gNBs) in the NR/5G terminology. In the scope of the present disclosure, the gNBs may be configured in accordance with 3GPP TS 38.331 V15.8.0 (2020-01), herein incorporated by reference, in particular in regard to initiating the transition between different RRC states.

The network system 100 further comprises a core network 106 communicatively coupled to the at least one radio access network 102. The core network 106 includes multiple components that are not shown in FIG. 2. These components will be discussed in greater detail below with reference to FIG. 10.

Further still, the network system 100 comprises an OSS 108 (also called network management system, NMS) communicatively coupled to one or both of the core network 106 and the radio access network 102. The OSS 108 includes an analytics system 110 and a configuration manager 112. The analytics system 110 is configured to gather and process information from one or both of the radio access network 102 and the core network 106, including information for performing RRC. The configuration manager 112 is configured to set configuration parameters in one or both of the radio access network 102 and the core network 106, including configuration parameters for RRC.

The analytics system 110 of FIG. 2 will now be described in greater detail with reference to FIG. 3 and in the particular context of gathering and processing information for transition control between different RRC states of terminal devices 104. The different RRC states in an exemplary NR/5G implementation are illustrated by the state machine of FIG. 1. General aspects regarding this state machine and the individual transitions are defined in Sect. 4.2.1 of 3GPP TS 38.331 V15.8.0 (2020-01), herein incorporated by reference. Sects. 5.3.8 (RRC connection release), 5.3.9 (RRC connection release requested by upper layers) and 5.3.13 (RRC connection resume) discuss the details of the different state transition procedures, herein incorporated by reference. Of course, the present disclosure is also applicable in the context of, for example, a 4G implementation that will generally not include the INACTIVE state shown in FIG. 1.

Figure 3:
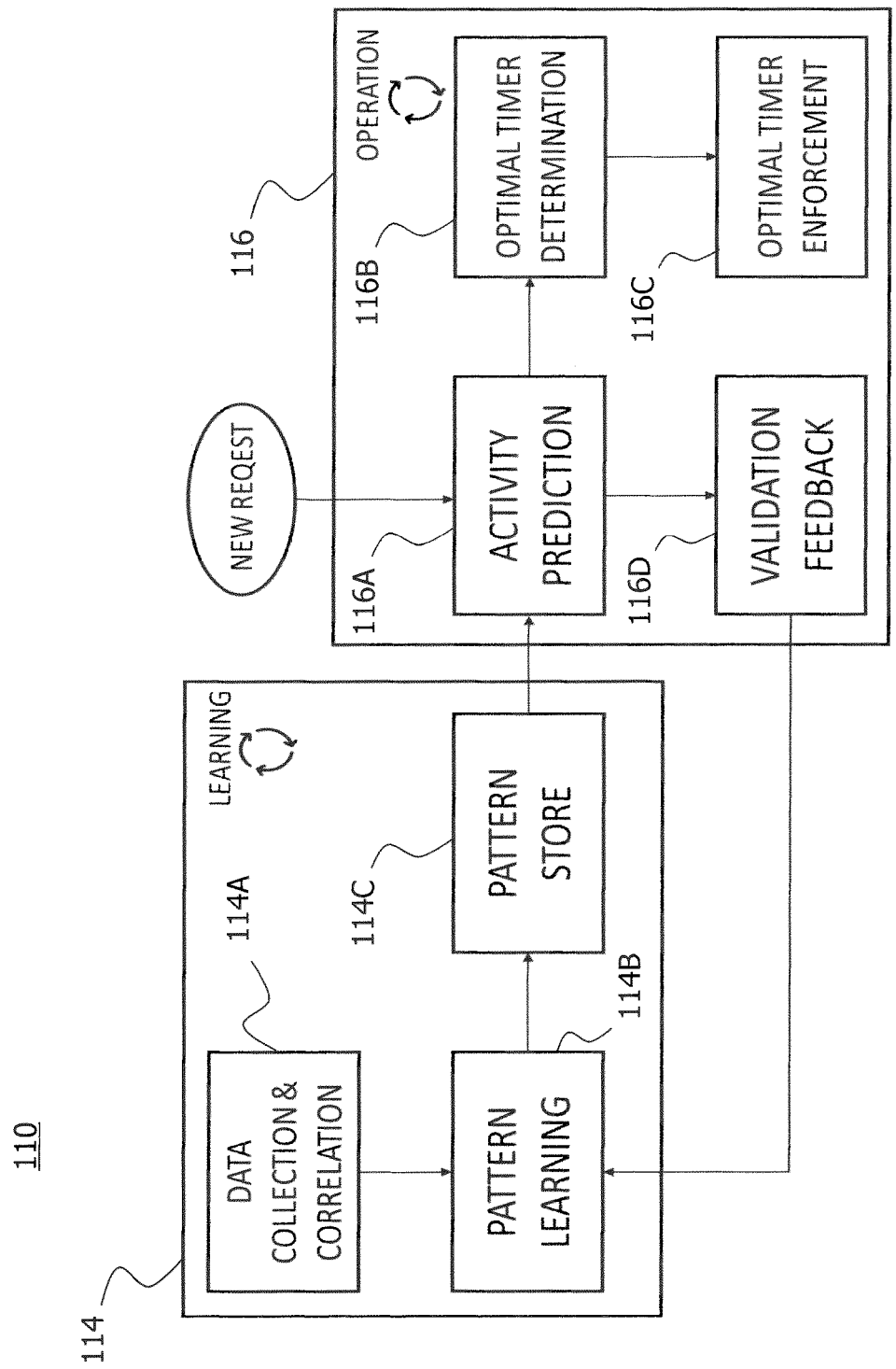
FIG. 3 is a diagram illustrating an analytics system embodiment of the present disclosure that may form a part of the NR/5G network system embodiment of FIG. 2.

The analytics system 110 of FIG. 3 comprises a parameter learning apparatus 114 and an operational apparatus 116. The apparatuses 114, 116 can be operated separately or simultaneously. In some variants, the apparatuses 114, 116 can be realized as a single hardware component or as distributed hardware components within the analytics system 110. In a typical use case, both apparatuses 114, 116 are operated continuously and in real-time during regular operation of the network system 100.

In brief, the parameter learning apparatus 114 is in charge of determining and storing temporal inactivity parameters for controlling transitions between the different RRC states of the terminal devices 104. The operational apparatus 116, in turn, is in charge of individually triggering the RRC state transitions per terminal device 104 that is to be controlled and based on the temporal inactivity parameters determined and stored therefor by the learning component 114. The temporal inactivity parameters, or parameters derived on the basis of the temporal inactivity parameters, may in particular be used to control RRC state transition timing mechanisms (e.g., to control RRC timer settings) per terminal device 104.

Alternative RRC proposals operate with fix or configurable RRC timer settings either for the whole network system 100 or for a given network slice thereof. It has been realized that such proposals cannot address the huge variety of use-cases (in particular in a NR/5G scenario) and require significant efforts to identify proper settings. For example, even a simple software update on IoT devices (that changes their traffic patterns) can make network-wide settings ineffective and require significant efforts to again determine new configurations. Having to serve many different types of IoT devices with completely different communication characteristics can even lead to a situation where there do not exist any optimal settings at network or slice level. On the other hand, fix timer settings are in general suboptimal for the overall network system 100 concerning the amount of total signaling messages and, thus, the signaling load. These challenges can be addressed by determining, using the parameter learning apparatus 112 of FIG. 3, temporal inactivity parameters per terminal device 104 so as to dedicatedly control RRC state transition timing mechanisms per terminal device 104.

Figure 4:
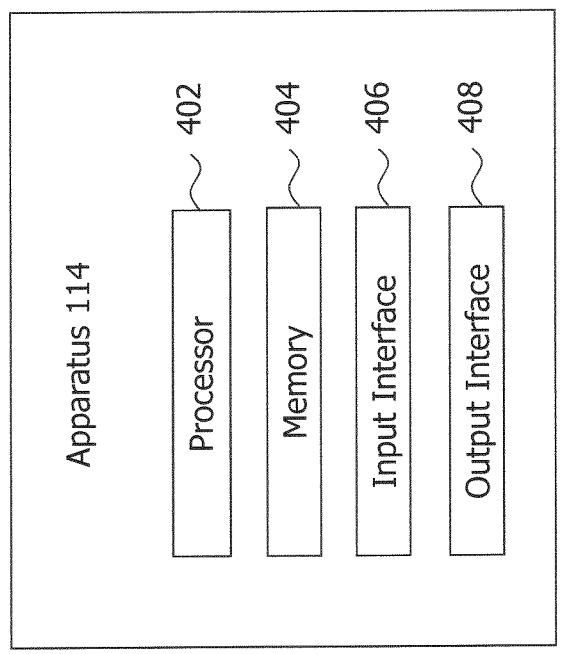
FIG. 4 is block diagram illustrating a first apparatus embodiment in accordance with the present disclosure.

The parameter learning apparatus 112 of FIG. 3 is configured to perform at least three dedicated functions 114A, 114B and 114C, namely data collection and correlation, pattern learning and pattern storage, respectively. The parameter learning apparatus 112 may have a hardware configuration as illustrated in FIG. 4 and comprise a processor 402 as well as a memory 404 coupled to the processor 402. The memory 404 stores program code that controls operation of the processor 402 so as carry out the functions 114A, 114B and 114C. The parameter learning apparatus 112 further comprises an input interface 406 and an output interface 408.

A high-level operation of the parameter learning apparatus 112 as depicted in FIG. 4 will now be described with reference to a method embodiment illustrated in the flow diagram 500 of FIG. 5.

Figure 5:
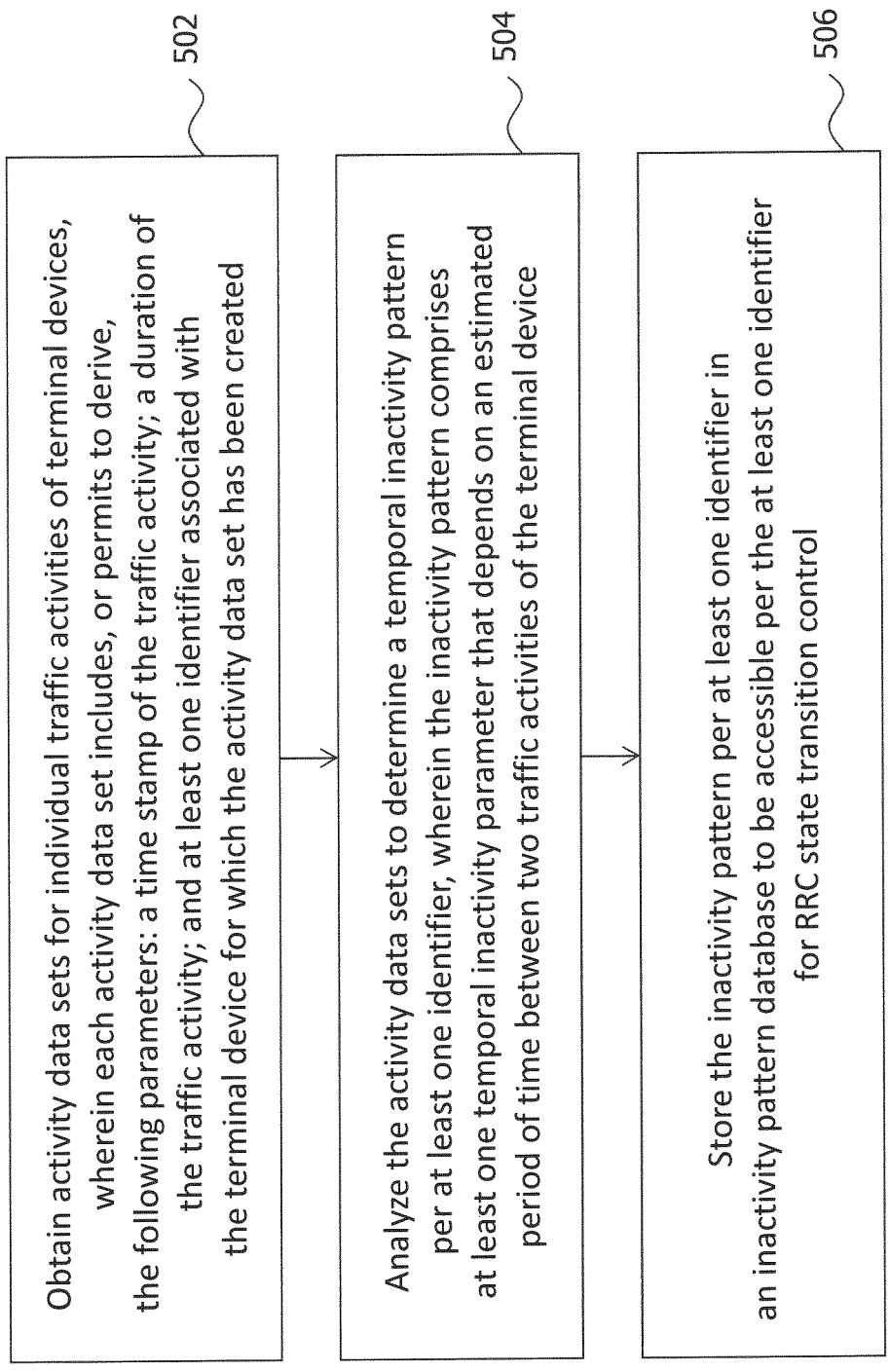
FIG. 5 illustrates a flow diagram of a first method embodiment of the present disclosure.

Operation of the parameter learning apparatus 112 comprises obtaining, via the input interface 406, activity data sets for individual traffic activities of a plurality of terminal devices 104, see step 502 in FIG. 5. The activity data sets thus obtained may at least temporally be stored in the memory 404 for being processed by the processor 402. Each activity data set obtained in step 502 includes, or permits to derive, at least the following parameters: a time stamp of the traffic activity (e.g., time of the day and date when the activity started); a duration of the traffic activity (e.g., in seconds); and at least one identifier associated with the terminal device 104 for which the activity data set has been created. It will be appreciated that instead of a time stamp of start of the traffic activity and traffic activity duration, the activity data sets could also include a time stamp of traffic activity start and a further time stamp of traffic activity end, or similar information. The at least one identifier may, for example, include one or both of a subscriber identifier (also called user identifier) and an equipment identifier (also called device identifier) as associated with the terminal device 104. Step 502 is performed by the data collection and correlation function 114A.

Operation of the parameter learning apparatus 112 further comprises analyzing, by the processor 404, the activity data sets obtained in step 502 to determine (i.e., to learn) a temporal inactivity pattern per at least one identifier, see step 504 in FIG. 5. The inactivity pattern thus determined comprises at least one temporal inactivity parameter that depends on an estimated period of time between two traffic activities of a particular terminal device 104 for which activity data sets have been obtained in step 502. Step 504 is performed by the pattern learning function 114B.

Further still, operation of the parameter learning apparatus 112 comprises storing the inactivity pattern per at least one identifier in an inactivity pattern database to be accessible per the at least one identifier for RRC state transition control per the at least one identifier, see step 506 in FIG. 5. The inactivity pattern database is realized in the memory 404 (or in a separate storage) and is configured to be accessed via the output interface 508 so as to output individual temporal inactivity parameters to the operational apparatus 116 upon request. Step 506 is performed by the pattern storage function 114C.

In the following, exemplary aspects of the functions 114A, 114B and 114C (and of the associated steps 502, 504 and 506) will be described in greater detail. Aspects of the data collection and correlation function 114A will be discussed first. As explained with reference to FIG. 5, this function 114A is responsible for providing the input data to the traffic pattern learning function 114B.

The input of the data collection and correlation function 114A are data records as gathered in one of both of the radio access network 102 and the core network 106 of FIG. 1 for end-to-end (E2E) communication sessions of a plurality of terminal devices 104 for which RRC is to be improved. The role of function 114A is to collect and correlate events from different sources (radio access and core network nodes, packet probes, etc.) belonging to one communication session into one record. Radio access network events include the details of attach, release, handover procedures, as well as radio environment measurements, and so on. Core network events include registration, mobility, user plane traffic metrics, traffic and service types, specific signaling information, and so on. The signaling events include identifiers relating to subscriber, terminal, call, session. Such identifiers may be used for correlation purposes. As an example, subscriber identifier and equipment (i.e., device) identifier may be captured in core network node events or via GPRS tunneling protocol- (GTP-) C probing, and a geographical location at the start of a traffic activity (e.g., a cell identifier) may be obtained from radio access network events. Time of the day, date, and other time stamps are typically available in each event, and a traffic activity length can be obtained from core network node events or via GTP-U probing.

As such, the data collection and correlation function 114A may correlate multiple input data records associated with the same one or more identifiers as needed. The output of the data collection and correlation function 114A is a continuous stream E2E communication session records as created from the input data records.

An E2E communication session record as output by the data collection and correlation function 114A to the pattern learning function 114B is an atomic traffic activity per subscriber/terminal device 104, that typically relates to data communication (e.g., downloading of a web page, performing a Voice over LTE, VoLTE, call, watching a video stream, etc). Each E2E communication session record thus relates to a traffic activity of a particular subscriber/terminal device 104, and between two subsequent traffic activities, there is inactivity for the given subscriber/terminal device 104. A typical output E2E communication session record of the data collection and correlation function 114A contains at least the following key fields (as far as available):

- at least one of a subscriber identifier (e.g., international mobile subscriber identity, IMSI, and/or subscription permanent identifier, SUPI) and an equipment/device identifier (e.g., international mobile equipment identity, IMEI, and/or IMEI type allocation code, IMEITAC) associated with the terminal device 104
- geographical location at the start of the activity (e.g., cell identifier of serving gNB)
- time of day of start of traffic activity
- date of traffic activity
- activity length of traffic activity (e.g., in seconds)

The activity length is the total time of a particular traffic activity. This naturally does not mean that there were actual bytes sent uplink or downlink from/to the terminal device 104 in every single second of the communication session. With the usage of an optional activity timeout parameter, it can be ensured that at a maximum this amount of inactivity is possible within a single E2E communication session. If the timeout parameter is exceeded, a new E2E communication session record will be created for a given identifier or identifier combination (i.e., a given subscriber and/or terminal device 104) by the data collection and correlation function 114A and output by the data collection and correlation function 114A to the pattern learning function 114B. Each E2E communication session record received by the pattern learning function 114B is therefore indicative of an atomic traffic activity.

The pattern learning function 114B processes the E2E communication session records output by the data collection and correlation function 112 for learning temporal inactivity patterns per at least one identifier. The pattern learning function 114B then creates a dedicated inactivity record containing the learnt inactivity pattern for each subscriber. This record is stored per at least one (subscriber/device) identifier in the inactivity pattern database maintained by the pattern storing function 114C. The objective of this learning is to derive any meaningful inactivity period pattern for a given subscriber and/or terminal device 104.

In order to facilitate this, from the continuously incoming data stream containing the E2E communication session records, the pattern learning function 114B first derives the inactivity periods between each pair of subsequent traffic activities associated with the same at least one identifier, and stores this as inactivity distribution data per at least one (subscriber/device) identifier in the inactivity pattern database. The observed inactivity periods per at least one identifier may be augmented with auxiliary information as included in the E2E communication session records received by the pattern learning function 114B. Exemplary parameters of auxiliary information include time of the day of the traffic activity, date of the traffic activity, terminal device (i.e., equipment) type and geographic location of the traffic activity.

Figure 6A:
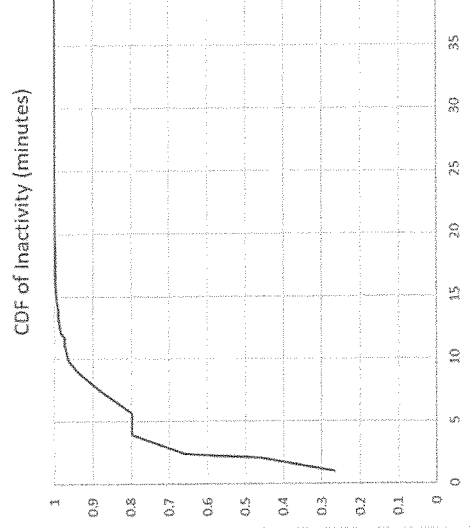
FIGS. 6A to D are diagrams illustrating exemplary CDFs that can form the basis of embodiments of the present disclosure.
Figure 6B:
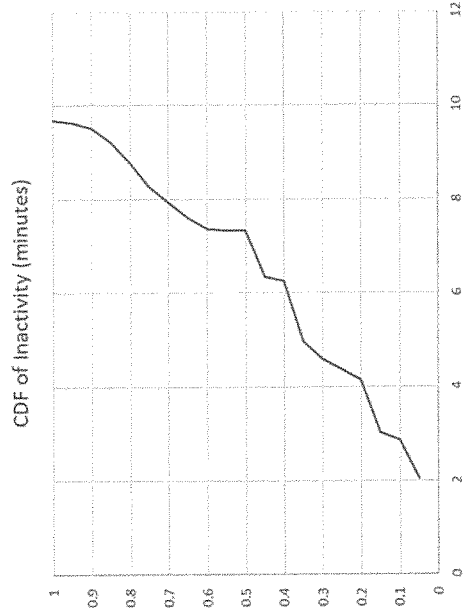

The charts of FIGS. 6A to 6B illustrate examples of inactivity period distribution types. The charts show the cumulative distribution function (CDF) for the inactivity period for a given identifier denoting, for example, a given subscriber.

Figure 6C:
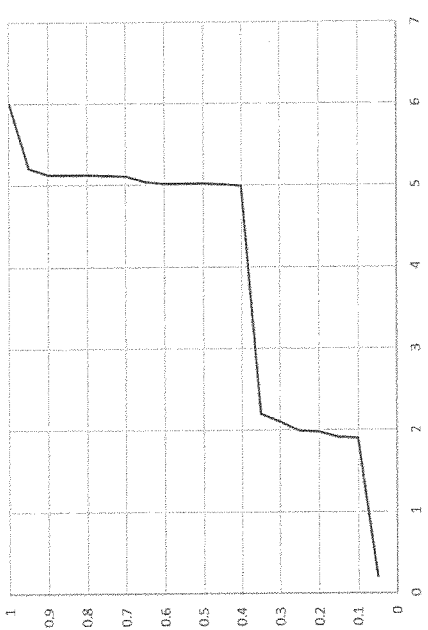
Figure 6D:
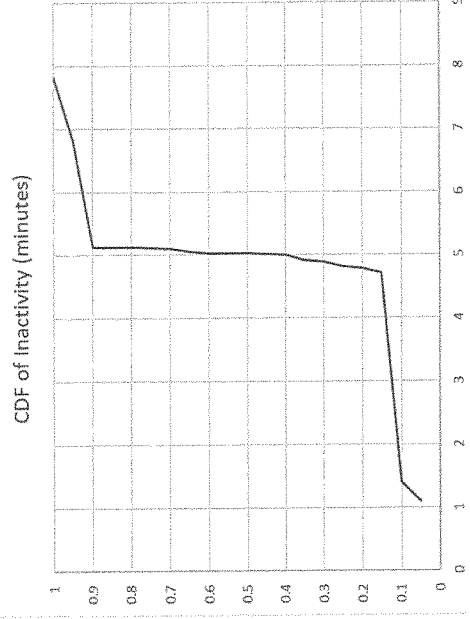

In FIG. 6A, the inactivity period is uniform or normally distributed in the interval 2-10 minutes. No typical inactivity period can be derived therefrom. In FIG. 6B, the inactivity period grows exponentially. It typically is small, but can take any large value with exponentially smaller probability. This distribution is indicative of a typical human behavior. No typical inactivity period can be extracted, but a suitable timer setting can still be derived, or a network-wide setting can be offered. FIG. 6C illustrates a unimodal inactivity period pattern. The corresponding subscription may be associated with an IoT device (e.g., a smart device) regularly sending data approximately every 5 minutes. In FIG. 6D, multimodal inactivity period patterns can be detected. The corresponding subscription may be associated with an security surveillance IoT device, sending data every 2 minutes in the office hours and every 5 minutes in the rest of the time.

As will be described in more detail with reference to FIG. 9, the operational apparatus 116 will use the learnt patterns at the time when a new traffic activity is just starting, to estimate when the next traffic activity will start after that. Inactivity period information can thus be learnt by the pattern learning function 114B from the CDFs as the period of time between the end of the previous traffic activity (e.g., previous E2E communication session) and the start of the current traffic activity (e.g., current E2E communication session), per at least one identifier. This information can be stored as temporal inactivity pattern. In the scenario of FIG. 6C, the pattern can be defined by a single temporal inactivity parameter indicative of an estimated period of 5 minutes between two subsequent traffic activities. In the scenario of FIG. 6D, the pattern will be more complex and can be defined by two temporal inactivity parameters indicative of an estimated period of 2 minutes between two subsequent traffic activities for business hours and an estimated period of 5 minutes between two subsequent traffic activities during the rest of the time, respectively. The corresponding time of the day may thus be stored as one parameter, or dimension, of auxiliary information in the associated temporal inactivity pattern.

In addition to learning the inactivity period distribution, also a mobility pattern may be learnt by the pattern learning function 114B from the geographic location data indicated in the E2E communication session records. That is, the E2E communication session records can also by used to derive a mobility pattern per at least one identifier (i.e., per subscriber/terminal device 104). The visited cells of the radio access network 102 in a given time window can serve as input for this learning step. The number of visited cells and the size of the covered area can be determined also. The procedure for mobility determination might involve an analysis the rest of the available data dimensions in the process. For instance, a terminal device 104 can be stationary in the night and can have a certain mobility pattern in the day, wherein the mobility pattern is again associated with a specific inactivity period distribution as explained above. The corresponding geographic locations and, optionally, any mobility derived therefrom may thus be stored as another dimension of auxiliary information in the associated temporal inactivity pattern.

Pattern learning by the pattern learning function 114B can be executed periodically, when there are statistically significant data points for at dedicated subscriber or terminal device 104 (as defined by the at least one associated identifier) in the inactivity period distribution analysis, or when there is a need for pattern computation (no pattern exists yet) or pattern re-computation (changes are observed in patterns).

The pattern learning function 114B examines the distribution of the observed inactivity periods for the dedicated subscriber or terminal device 104 (see FIGS. 6A to 6D). The analysis is focusing on identifying steep increases in the CDF of the inactivity period. The result of the analysis can basically be the following:

There are no typical inactivity periods (FIGS. 6A and 6B)
There is one typical inactivity period (FIG. 6C)
There are multiple typical inactivity periods (FIG. 6D)

A typical inactivity period is indicative of an estimated period of time between two immediately adjacent traffic activities of a terminal device 104. In case multiple typical inactivity periods can detected, a further procedure is executed to explore any characteristics of the multiple inactivity periods. The outcome of this procedure can be the following:

No further patterns can be detected
Some or all of the typical inactivity periods highly correlate in regard to one or more parameters (i.e., dimensions) of auxiliary information, such as the same location, same time of the day, or day of the week, and so on. For example, a terminal device 104 may send measurement data every 10 minutes on weekdays, but only every 60 minutes on weekends. Such temporal inactivity patterns are then learnt by the pattern learning function 114B and stored in the inactivity pattern database as a dimension of auxiliary information (day of the week).

Regularly, the unneeded (old) part of inactivity distribution raw data (see FIGS. 6A to 6D) can be deleted from memory to avoid memory overflow and to keep only the latest data that is still covering a significant period to enable pattern learning. In addition, if the result of the analysis is that patterns can be detected (no typical inactivity periods exist), the whole inactivity distribution raw data can be deleted for the subscriber/terminal device 104 until the next round of pattern learning, when new raw data will be again available.

The inactivity pattern database maintained by the pattern storing function 114C contains the following temporal inactivity pattern data per at least one identifier:

The observed inactivity period distribution (augmented with auxiliary information such as time of the time, date, location, device type, etc.).
The learnt inactivity pattern (if any) in the form of one or more temporal inactivity parameters each indicative of an estimated period of time between two subsequent traffic activities (i.e., an estimated inactivity period), such as
a single value or multiple values, with characterization of each value with the available extra dimension(s) of auxiliary information (geographic location, time of the day, date, device type, etc.).

The quality and reliability of the learnt pattern (as determined based on one or more statistical parameters such as a mean deviation and/or based on validation feedback from the actual RRC process in which a particular temporal inactivity parameter read from the database was involved, see description of validation feedback function below).

The mobility pattern, if available, such as number of cells visited, area covered by a movement, drill-down details if available (typically involving time of the day and date).

Figure 7:
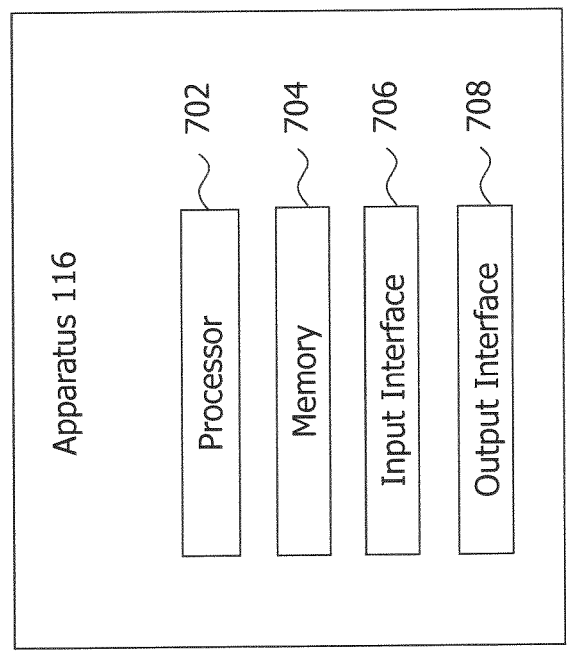
FIG. 7 is block diagram illustrating a second apparatus embodiment in accordance with the present disclosure.

The content of the inactivity pattern database as maintained by the pattern storing function 114C will be used by the operational apparatus 116 of FIG. 3 to individually and adaptively trigger transition control between different RRC states of terminal devices 104. To this end, the operational apparatus 116 is configured to perform at least four dedicated functions 116A, 116B, 116C and 116D, namely activity prediction, determination of an optimal timer setting, enforcement of the optimal timer setting, and validation feedback, respectively. The operational apparatus 116 may have a hardware configuration as illustrated in FIG. 7 and comprise a processor 702 as well as a memory 704 coupled to the processor 702. The memory 704 stores program code that controls operation of the processor 702 so as carry out the functions 116A, 116B, 116C and 116D. The operational apparatus 116 further comprises an input interface 706 and an output interface 708.

A high-level operation of the operational apparatus 116 as depicted in FIG. 7 will now be described with reference to a method embodiment illustrated in the flow diagram 800 of FIG. 8 and with reference to the time diagram 900 of FIG. 9. The time diagram 900 is based on the NR/5G state machine state machine of FIG. 1 and on the following assumptions. A given terminal device 104 assumes, or transits to, the CONNECTED state in preparation for start of a traffic activity (in this regard, FIG. 9 illustrates two subsequent traffic activities 1 and 2). It is further assumed that the is terminal device 104 autonomously, or in response to a network command, transits from the CONNECTED state to the INACTIVE state once the traffic activity stops. It is also assumed that a further transition from the INACTIVE state to the IDLE state is governed by an RRC state transition timing mechanism (here: in the form of an inactivity timer) that is set based on the temporal inactivity parameter discussed above or based on a parameter derived on the basis of the temporal inactivity parameter. The temporal inactivity parameter may directly be indicative of a certain timer setting or may be used to derive a certain timer setting therefrom.

Figure 8:
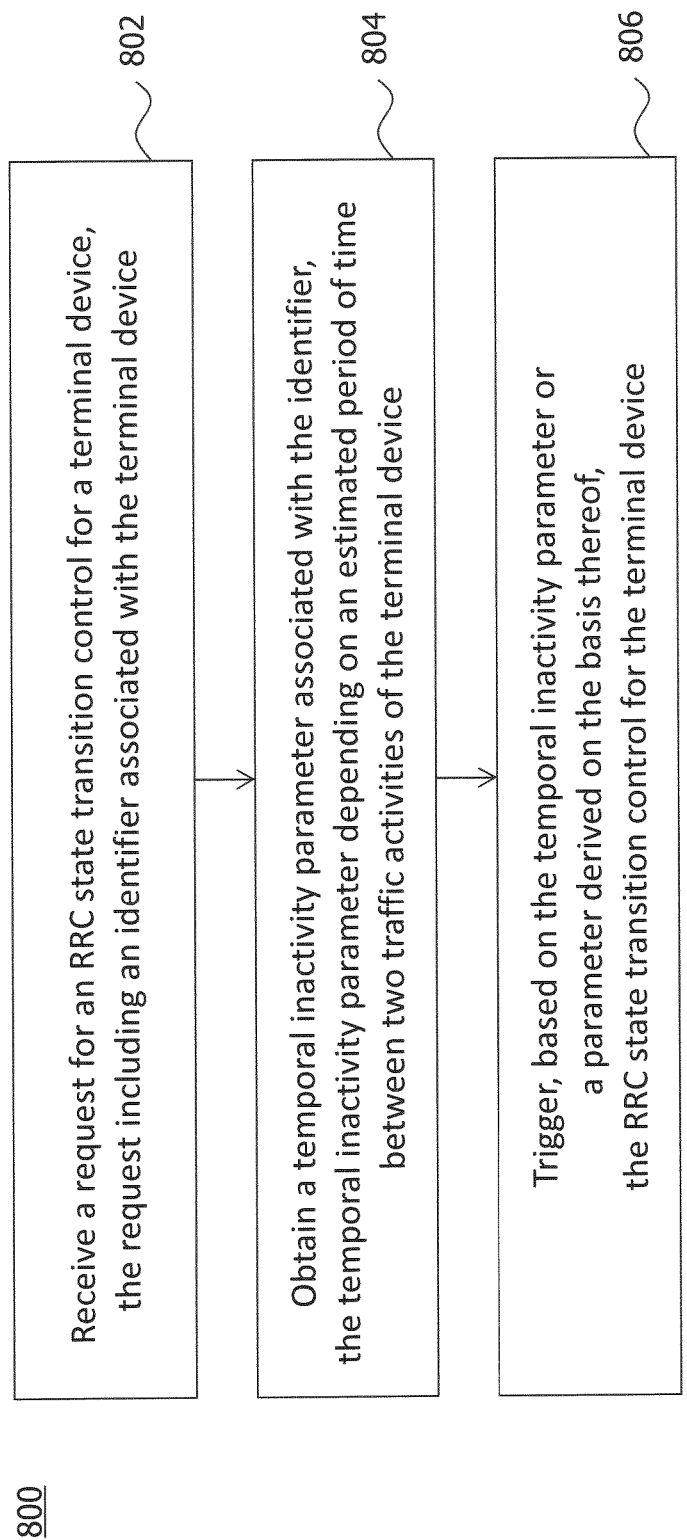
FIG. 8 illustrates a flow diagram of a second method embodiment of the present disclosure.

Now referring to FIG. 8, operation of the operational apparatus 116 comprises receiving, via the input interface 706, a request for an RRC state transition control for a terminal device 104, see step 802 in FIG. 8. The request includes at least one identifier associated with the terminal device 104. The at least one identifier associated with the terminal device 104 may comprise one or both of a subscriber identifier (e.g., IMSI and/or SUPI) and an equipment identifier (e.g., IMEI and/or IMEITAC). Step 802 will be performed by the activity prediction function 116A.

The request received in step 802 by the operational apparatus 116 may have been generated within the radio access network 102 or the core network 106 for a new communication session (i.e., a "current" traffic activity) that is to be or has just been established for the terminal device 104 associated with the at least one identifier included in the request. With reference to the time diagram 900 of FIG. 9, the request received in step 802 may thus have been generated in response to detection of start of "traffic activity 1" or start of "traffic activity 2". In the following, only start of "traffic activity 1" will be considered further.

Optionally, the request received in step 802 comprises auxiliary information, such as a time of day, a date, a device type or a geographic location associated with establishment of the new communication session or with the terminal device 104, respectively. Such auxiliary information may be used in the following step 804.

Operation of the operational apparatus 116 further comprises obtaining, by the processor 702, a temporal inactivity parameter associated with the at least one identifier, see step 804 in FIG. 8. To this end, the operational apparatus 116 queries the pattern storing function 114C for the temporal inactivity parameter associated with the at least one identifier received in step 802. The pattern storing function 114C retrieves the corresponding temporal inactivity parameter from the inactivity pattern database and returns it to the operational apparatus 116. In case auxiliary information has been received in step 802, this information may also be forwarded to the pattern storing function 114C (as additional "dimension(s)") to be used for retrieving the proper temporal activity parameter that is (also) associated with the auxiliary information. The temporal inactivity parameter obtained in step 804 depends on an estimated period of time between two traffic activities of the terminal device 104, as described above with reference to FIG. 5. The temporal inactivity parameter may directly be indicative of a certain RRC state transition timing mechanism setting (here: in the form of an inactivity timer setting) or may be used to derive a certain setting therefrom. The time diagram of FIG. 9 illustrates that the inactivity timer setting is obtained shortly after start of "traffic activity 1". Step 804 will be performed by the activity prediction function 116A in optional cooperation with the optimal timer determination function 116B.

Further still, the method comprises triggering, based on the temporal inactivity parameter or a parameter derived on the basis of the temporal inactivity parameter, the RRC state transition control for the terminal device 104, see step 806 in FIG. 8. In the present embodiment, step 806 comprise controlling, for example via the output interface 708, a setting of the inactivity timer in accordance with the temporal inactivity parameter (i.e., the inactivity timer setting in the form of a particular duration of time) as obtained in step 804. Step 804 will be performed by the optimal timer enforcement function 116C in optional cooperation with the optimal timer determination function 116B.

Figure 9:
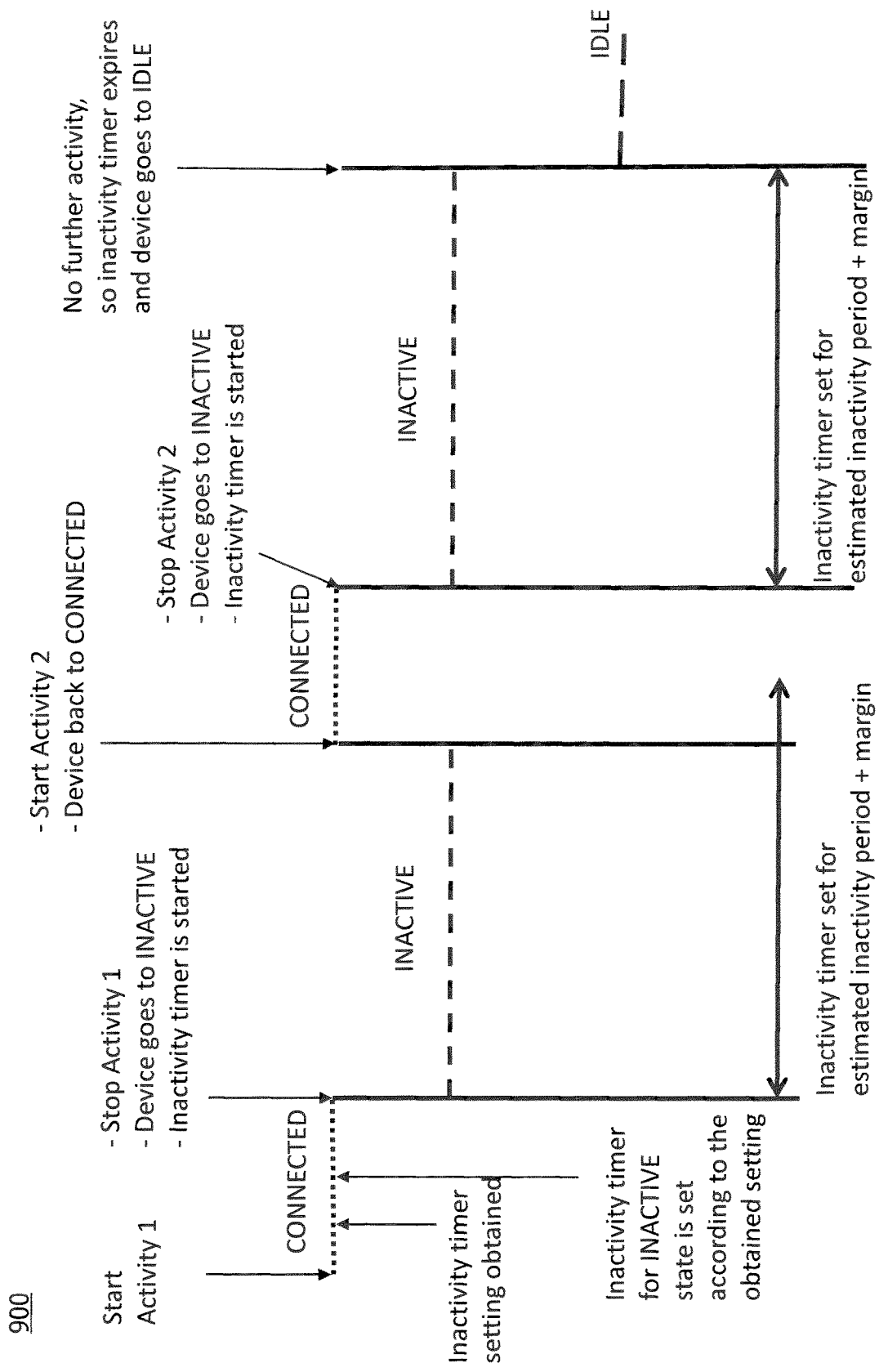
FIG. 9 illustrates a time diagram embodiment of the present disclosure.

The time diagram of FIG. 9 illustrates that the inactivity timer is set in the context of step 806 and shortly after the corresponding inactivity timer setting has been obtained in step 804 (and while the terminal device 104 is still in the CONNECTED state). As also illustrated in FIG. 9, the terminal device 104 transits in the INACTIVE state once "traffic activity 1" stops, and at the same time the RRC state transition timing mechanism (i.e., the inactivity timer) is started.

In step 806, RRC transition control is triggered in anticipation of the next traffic activity of the terminal device 104 (i.e., traffic activity 2) and following the current traffic activity (i.e., traffic activity 1). In more detail, the RRC state transition control is triggered such that the terminal device 104 is prevented from transiting, before the anticipated next traffic activity "traffic activity 2", to the IDLE state associated with a lower power consumption level (and higher latency) than the INACTIVE state. The prevention of this transition increases RRC efficiency as the next traffic activity "traffic activity 2" is estimated to start a potentially learnt (estimated) period of time after end of the current traffic activity "traffic activity 2". Evidently, the CONNECTED state that ensues can more efficiently be reached from the INACTIVE state than from the IDLE state.

As explained above, the temporal inactivity parameter obtained in step 804 is generally indicative of an estimated period of time between two subsequent traffic activities of the terminal device 104. To safely prevent an undesired transition from the INACTIVE state to the IDLE state, it may be desirable to extend the estimated period of time by a certain safety period, or safety margin. To this end, the optimal timer determination function 116B may derive the "optimal" inactivity timer setting from the temporal inactivity parameter by adding to the corresponding estimated period of time a temporal safety margin, see the double-headed arrows at the bottom of FIG. 9. The terminal device 104 is thus forced to "definitely" stay in the INACTIVE state until somewhat after the expected start of the next traffic activity (i.e., "traffic activity 2" in FIG. 9). For this reason, the terminal device 104 can transit from the INACTIVE state directly to the CONNECTED state, as also shown in FIG. 9, when the next traffic activity actually occurs as anticipated. If, however, the anticipated next traffic activity does not occur and the inactivity timer thus expires, the terminal device 104 will indeed transit to the IDLE state, as shown on the right-hand side of FIG. 9.

In the following, further aspects of the functions 116A, 116B, 116C and 116D (and of the associated steps 502, 504 and 506) will be described in greater detail.

Further aspects in regard to the activity prediction function 116A will be explained first. As discussed with reference to FIG. 8, this function 116A is responsible for obtaining the proper temporal activity parameter for triggering RRC state transition control in regard to a particular terminal device 104 that has just requested start of a new E2E communication session, i.e., a new traffic activity. The activity prediction function 116A, by relying on the learnt pattern in the inactivity pattern database, obtains a temporal inactivity parameter indicative of an estimated period of time when the next traffic activity will happen, calculated from an end of the current traffic activity. If there is no learnt pattern in the inactivity pattern database, a global network setting may be returned to the activity prediction function 116A. If there is one temporal inactivity parameter indicative of one typical inactivity period, this single parameter is returned. If there exist multiple temporal inactivity parameters indicative of different inactivity periods in the database, the appropriate temporal inactivity parameter is returned. The appropriate temporal inactivity parameter is determined by checking the available auxiliary information (i.e., the one or more further dimensions) of the current traffic activity, such as geographic location, device type, time of day, day of week, and so on.

The optimal timer determination function 116B enables implementation of an autocorrection feature to compensate for unexpected traffic activities disrupting on otherwise regular traffic activity pattern. Assume, for example, that there is a terminal device 104 that is estimated to send measurement results in individual bursts every 10 minutes. Thus, the proposed inactivity timer is set to (10+margin) minutes, say 11 minutes for the current traffic activity that is just starting. Then, however, an unexpected software update is installed on the terminal device 104, namely after 4 minutes. For the next traffic activity, by knowing that the current activity is out of pattern, the optimal timer determination function 116B system sets the inactivity timer to 7 minutes instead of 11 minutes, because the traffic burst at 4 minutes was treated as an extra burst.

In some variants, the inactivity timer setting that finally will be communicated to the appropriate network element in the radio access network 102 may be determined by the optimal timer determination function 116B based on a cost analysis (e.g., a cost/benefit analysis) that evaluates one or more alternative timer intervals in comparison to the time interval indicated by the temporal inactivity parameter (plus the optional safety margin). Depending on the result of that analysis, either directly the originally calculated time interval estimate (e.g., the time interval indicated by the temporal inactivity parameter plus the optional safety margin) remains the final value, or this estimate is altered or replaced, either by a network-wide setting or by a setting obtained from a specific formula embedded in a cost function.

The cost function may consider one or multiple cost terms, such as signaling cost (which is a cost of using network resources). Signaling cost is especially high in case of high load or a congested network situation. Another next term is battery usage by the terminal device 104, which strongly depends on the terminal device type and the application type. It is negligible for a terminal device 114 connected to a stationary power source, but can be expensive for a small IoT device which does not have the possibility to charge its battery. An additional term can be associated with accessibility time, which can be important for applications using an emergency service. In this case, an IDLE state may have a higher cost than keeping the terminal device 104 in INACTIVE or CONNECTED state.

Thus, one may associate weights and associated cost terms per terminal device 104 to RRC states (here: IDLE, INACTIVE, CONNECTED) and transitions among these states. The weights of these terms strongly depend on terminal device types and the service used. One can also associate an overall cost term to the network and served terminal devices 104. The general goal is to optimize and minimize the overall cost. But there can be use cases when cost should be optimized for the network only or for certain services. An exemplary cost function C can be formulated as follows:

$$C = W\_1 * C\_idle * t\_idle + W\_2 * C\_connected * t\_connected + W\_3 * C\_inactive * t\_inactive + W\_4 * C\_(idle\text{-}connected) * No\_(idle\text{-}connected) + W\_5 * C\_(inactive\text{-}connected) * No\_(inactive\text{-}connected)$$

In the above cost function, $W\_1$ to $W\_5$ are weights, C_idle/connected/inactive are the costs for being in a certain state, t_idle/connected/inactive is the period of time in a certain state, C_(x-y) is the cost for a transition from state x to state y, and No_(x-y) is the number of transitions from state x to state y.

The cost function is thus used for optimizing the setting of the RRC state transition timing mechanism. The time the terminal device 104 spends in different RRC states and the number of transitions between RRC states all depend on the RRC state transition timing mechanism. The cost function may in some variants be expressed as single function, which can be minimized (or, generally, optimized) for the setting of the RRC state transition timing mechanism. This approach results in an optimum value of the particular RRC state transition timing mechanism (e.g., RRC state transition timer of a the particular terminal device 104) that is to be configured. In one implementation, only the relative cost values are processed and, therefore, the absolute values are not of importance.

As an example, if the timer setting is short, the terminal device 104 will spend less time in the INACTIVE state and more in the IDLE state. The IDLE state cost is low and, therefore, it decreases the overall cost. However, the number of transitions from the INACTIVE state to the IDLE state will be higher, which increases the overall cost. If this extra cost is lower than the saved one, then the inactivity timer is decreased. These cost terms are evaluated until an optimum timer setting has been found.

Keeping the terminal device 104 in CONNECTED state is the fastest way of accessing data, and no session setup signaling is needed in this regard. However, continuous radio measurement and reporting is needed between the terminal device 104 and the base station to ensure mobility. This procedure continuously uses radio resources and extensively consumes battery power.

It is straightforward to send the terminal device 104 to IDLE state after a long inactive period, which basically does not use radio resources and battery power except for paging. This approach, however, requires setting up the RRC connection and user equipment (UE)-core network (CN) context every time the terminal device 104 wants to send data or should be accessed.

It is to be noted that the signaling cost and the optimum timer setting also depends on the mobility and the traffic pattern of the terminal device 104. Therefore, the above weights (W) depend implicitly on the mobility and traffic activity of the terminal device 104 as well. The mobility requires extra radio environment measurements and accompanied signaling load. Therefore, keeping the terminal device 104 in CONNECTED state is more expensive for mobile than for stationary terminal devices 104. Frequent downlink activity further increases the associated radio access network (RAN) paging signaling load because of the RAN notification areas. On the other hand, if there is high traffic activity, keeping the terminal device 104 in CONNECTED state may result in a lower overall cost because the number of INACTIVE to CONNECTED state transitions is lowered.

The validation feedback function 116D can optionally be called after the inactivity timer setting has been obtained and sent to the appropriate network elements for enforcement. In more detail, a validation loop can be executed that compares an actual (e.g., measured) period of time between two traffic activities (e.g., between end of "traffic activity 1" and start of "traffic activity 2" in FIG. 9) with the estimated period of time as obtained from the database in step 804. The associated temporal inactivity pattern in the database may then be modified (e.g., newly calculated or just adjusted) based on a result of this comparison. For example, the result of the comparison is sent back to the pattern learning function 114B, which stores it cumulatively in the pattern store along the other data per at least one identifier to determine a modified temporal inactivity pattern in the next calculation cycle.

The validation feedback function 116D may be implemented in various ways. For example, whenever a good evaluation occurs (e.g., a difference determined by the comparison falls below a given threshold), a positive feedback is given, and whenever a negative evaluation is the outcome, a negative feedback is given. These feedbacks are continuously aggregated by reinforcement learning in the pattern learning function 114B. Whenever the state of the learnt pattern for a given at least one identifier proves to be inaccurate (many negative feedbacks vs. positive ones), a complete pattern re-computation is triggered in the pattern learning function 114B for the given at least one identifier.

Figure 10:
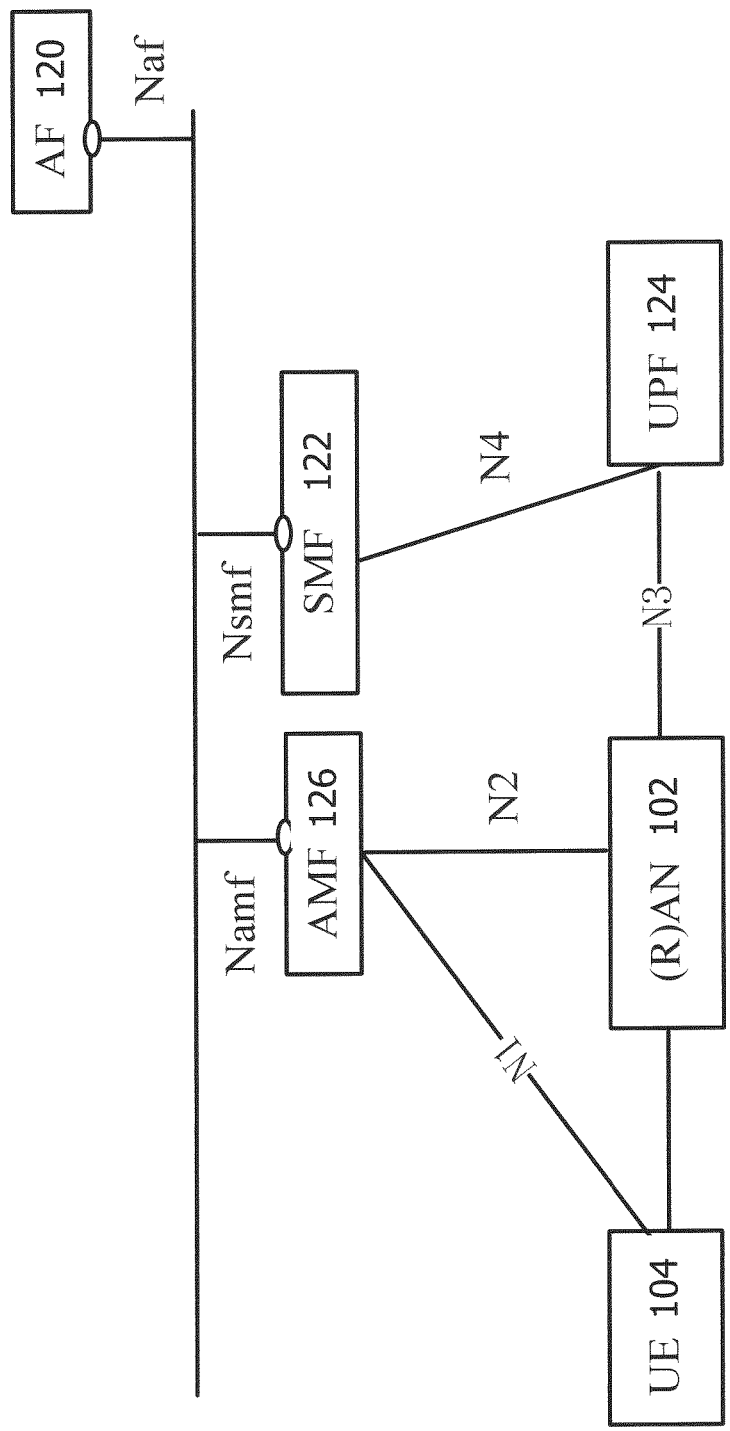
FIG. 10 is a diagram illustrating components of an NR/5G network system embodiment of the present disclosure.

In the following, concrete embodiments for triggering RRC state transition control of terminal devices 104 will be described for the NR/5G network system 100 with reference to FIGS. 10 to 12. FIG. 10 depicts a portion of the NR/5G reference architecture of the network system 100 as defined by 3GPP (see, e.g., Section 4.2.3 of 3GPP TS 23.501 V16.2.0). Particular network entities and core network interfaces of interest for the following embodiments are now discussed in more detail using the NR/5G standard terminology.

A UE constitutes an exemplary terminal device 104 (see FIG. 1). UE 104 can, for example, be configured as an endpoint of a video or audio streaming session that stretches through RAN 102.

An application function (AF) 120, that can be located outside the core network domain 102, is configured to interact with the core network domain 102 via an Naf interface. AF 120 may be configured as an application server and constitute the other endpoint in the video or audio streaming session with UE 104.

A session management function (SMF) 122 is a control plane function with an Nsmf interface. SMF 122 receives policy and charging control (PCC) rules and configures a user plane function (UPF) 124 accordingly. Among other things, SMF 122 controls the UPF packet processing by establishing, modifying or deleting packet forwarding control protocol (PFCP) sessions and by managing (i.e., adding, modifying or deleting) packet detection rules (PDRs) and associated actions, as defined in forwarding action rules (FARs), QoS enforcement rules (QERs) and/or usage reporting rules (URRs), per PFCP session.

UPF 124 has an N4 interface to SMF 122 and an N3 interface to RAN 102. UPF 106 supports classification and re-classification of application traffic based on the PDRs received from SMF 122.

An access and mobility management function (AMF) 124 handles access and mobility for UE 104.

Figure 11:
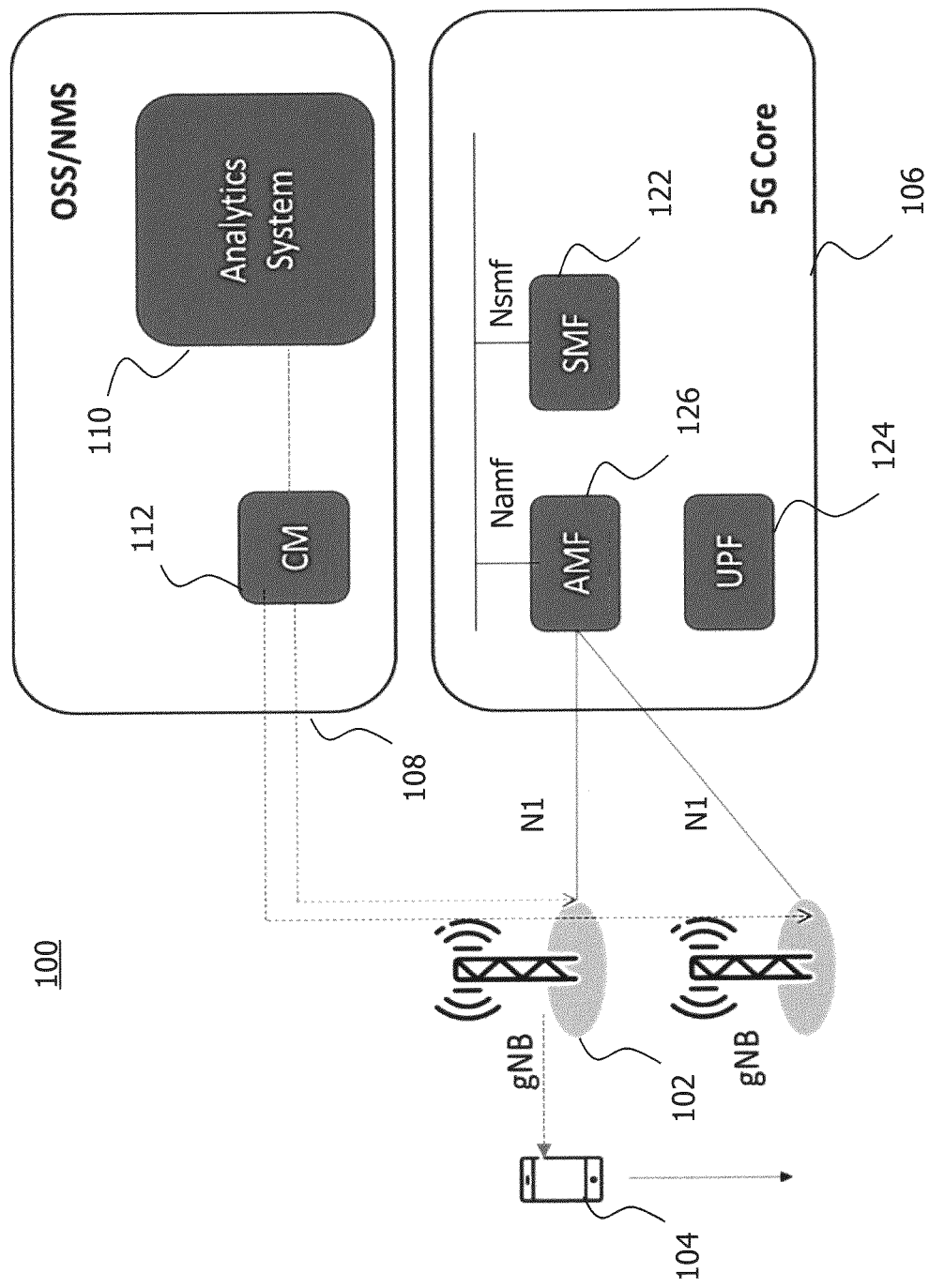
FIG. 11 is a diagram illustrating a first signaling embodiment in a NR/5G network system according to the present disclosure.
Figure 12:
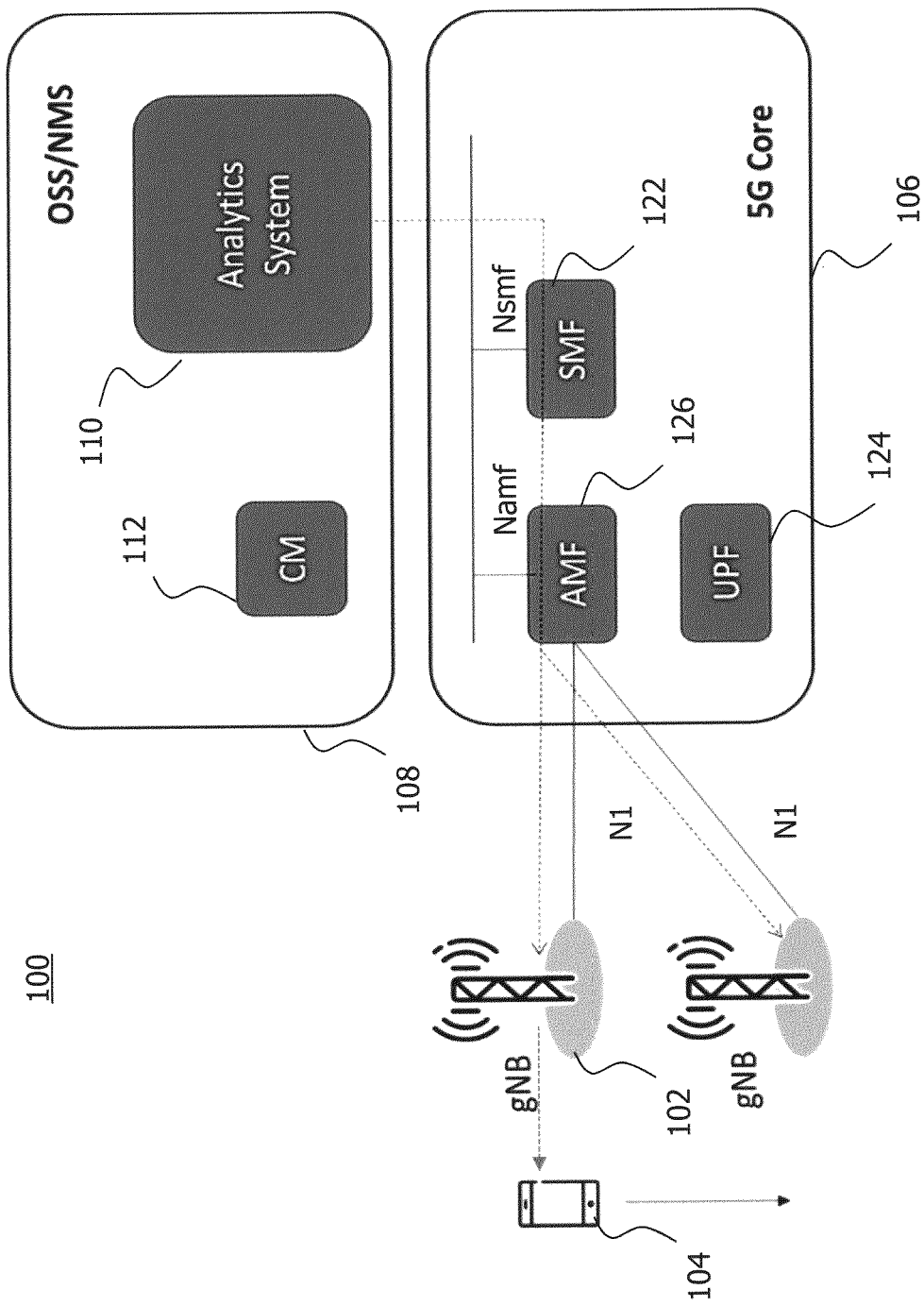
FIG. 12 is a diagram illustrating a second signaling embodiment in a NR/5G network system according to the present disclosure.

FIGS. 11 and 12 illustrate exemplary scenarios for triggering (i.e., enforcing) RRC state transition control by the optimal timer enforcement function 116C in the NR/5G network system 100 when configured in accordance with FIG. 10. In this way, the optimal per-user/per-device parameter settings can be communicated to the NR/5G network elements using standardized NR/5G functions. In both scenarios, it is assumed that the terminal device (UE) 104 is mobile and capable of moving between different gNBs.

As illustrated in FIG. 11, the optimal timer enforcement function 116C within the analytics system 110 may in one embodiment transmit the setting of the RRC state transition timing mechanism (i.e., of the inactivity timer) for a specific terminal device 104 to the configuration manager 112. The configuration manager 112, in turn, transmits that setting to the radio access network 102 with the plurality of gNBs. The serving gNB will then suitably configure the local inactivity timer of the terminal device 104.

As illustrated in FIG. 12, the optimal timer enforcement function 116C within the analytics system 110 may in another embodiment transmit the setting of the RRC state transition timing mechanism (i.e., of the inactivity timer) for a specific terminal device 104 via SMF 12 to AMF 124. AMF 124, in turn, transmits that setting to the radio access network 102 with the plurality of gNBs. The serving gNB will then suitably configure the local inactivity timer of the terminal device 104 by signaling (see, e.g., 3GPP TS 38.331 V15.8.0 (2020-01), in particular the sections cited above).

In the following, three exemplary use cases will be described in greater detail with the associated temporal inactivity patterns that will be learnt by the analytics system 110 for RRC state transition control as described above.

1. Personal Medical Monitoring and Surveillance Device/System

Personal medical monitoring and surveillance devices are one type of terminal devices 104 which can benefit from the adaptive management of the INACTIVE state presented herein due to the wide variety of usage and application patterns as well as due to long battery charging times. A central system (e.g., running in a remote cloud system) may analyze and supervise the personal (local) devices.

In one example, a medical device may continuously perform electrocardiogram measurements, which are reported periodically to the central system (e.g., medical center). It may need to send an exceptional result immediately for prompt analysis. Blood tests, on the other hand, may be performed by a medical device at a specific time of the day. Sleeping results are sent every morning for analysis depending on the user behavior. Moving activity and related measurements can also be monitored and sent for analysis to the central system, wherein the underlying pattern strongly depends on the user. Analysis results, warnings, and other messages are sent by the central system to the medical devices periodically and occasionally. Emergency alarms may have to be sent promptly, and a high risk may be detected earlier (to keep device in the INACTIVE state rather than in the IDLE state).

An application running on the medical device may be refreshed periodically, and also system parameters and data may be synchronized periodically Such temporal traffic activity (and inactivity) patterns of medical devices may be learnt and exploited for RRC state transition control as discussed above.

2. Connected Cars and Car Insurance System

A car, as another example for a terminal device 104, continuously monitors its route, traffic data, road conditions, engine and brake performance, battery (or fuel) level, and so on. The car sends its reports to a central system, which performs report analysis for different systems or service providers: insurance companies, mechanical workshops, gas stations, charging stations, road maintenance facilities, and so on. Typical communication activities include:

- Sending measurement and diagnostic data periodically when the car is moving
- Sending alarms and notifications in case of extraordinary events
- Occasionally communicating with other cars for traffic safety and optimization
- Sending emergency signals and reports in case of an accident
- Receiving and sending traffic information
- Sending reports about car usage, speed, etc. to insurance companies when using the car
- Regularly sending fuel/charging level information, and communicating with gas and charging stations occasionally depending on fuel/charging level
- There may be lack of wireless coverage in certain geographic areas, so instructions and data should be sent in advance before entering such areas, and measured data may be sent when again entering a covered area.

Such temporal traffic activity (and inactivity) patterns of cars may be learnt and exploited for RRC state transition control as discussed above.

3. Smart Devices

Smart devices such as smart meters (e.g., for measuring water, electricity or gas consumption) are characterized by two different type of traffic activities. The first traffic activity type comprises measuring and sending measured consumption data periodically Some smart devices, such as those for controlling charging of car batteries, require a trigger when resources are available or cheaper. Thus, the traffic activity of this type of smart devices strongly depends on the type and number of the controlled devices, user behavior, as well as the availability of resources and demand for resources (e.g., in case of electricity, if it is produced mostly by solar panels, the power is cheaper during the day, but if it is produced by water power stations, it is cheaper in night because the consumption is lower). Such temporal traffic activity (and inactivity) patterns of smart devices may be learnt and exploited for RRC state transition control as discussed above.

As has becomes apparent from the above embodiments, the proposed approaches enable adaptive per-user/per-device (i.e., per at least one associated identifier) RRC state transition settings in order to improve the efficiency of, for example, the inactivity state feature. A network monitoring functionality may collect and correlate data from different network domains on per-user/per-device level. Advanced analytics algorithms that employ, for example, statistical learning or rule-based processing determine and continuously update activity/inactivity patterns and derive the optimal parameter settings for the RRC state transitions per user/device.

One advantage that has become apparent from the embodiments is that the timing of transitions involving in particular the IDLE and INACTIVE states can be optimized. In this way, the signaling load of the network system 100 as well as the battery usage of terminal devices 104 are optimized. This functionality, though not limited to, can be especially important in case of massive IoT device roll-out, due to large number of terminal devices 104 and typically small-size batteries.

The proposed adaptive analytics and learning functions can be configured to automatically identify and update optimal timer settings for different RRC states per user/device based on activity monitoring, and no manual settings are needed. The pattern learning approach can identify even complex behavior patterns (such as a superposition of multiple elementary behaviors).

It will be appreciated that the present disclosure has been described with reference to exemplary embodiments that may be varied in many aspects. As such, the present invention is only limited by the claims that follow.

In the following description, alternative embodiments will be described.

Figure 13:
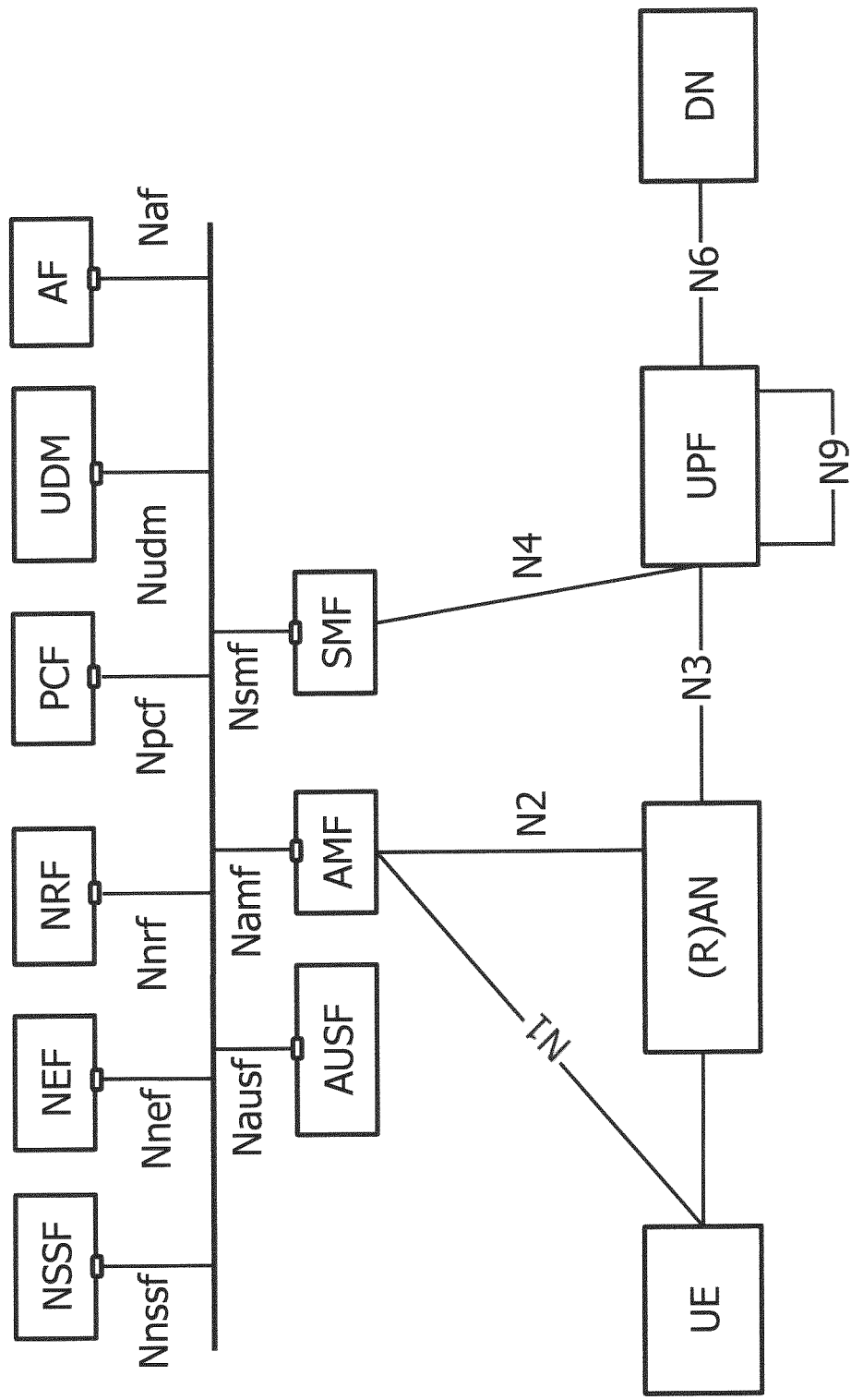
FIGS. 13-17 are illustrative of further embodiments.
Figure 14:
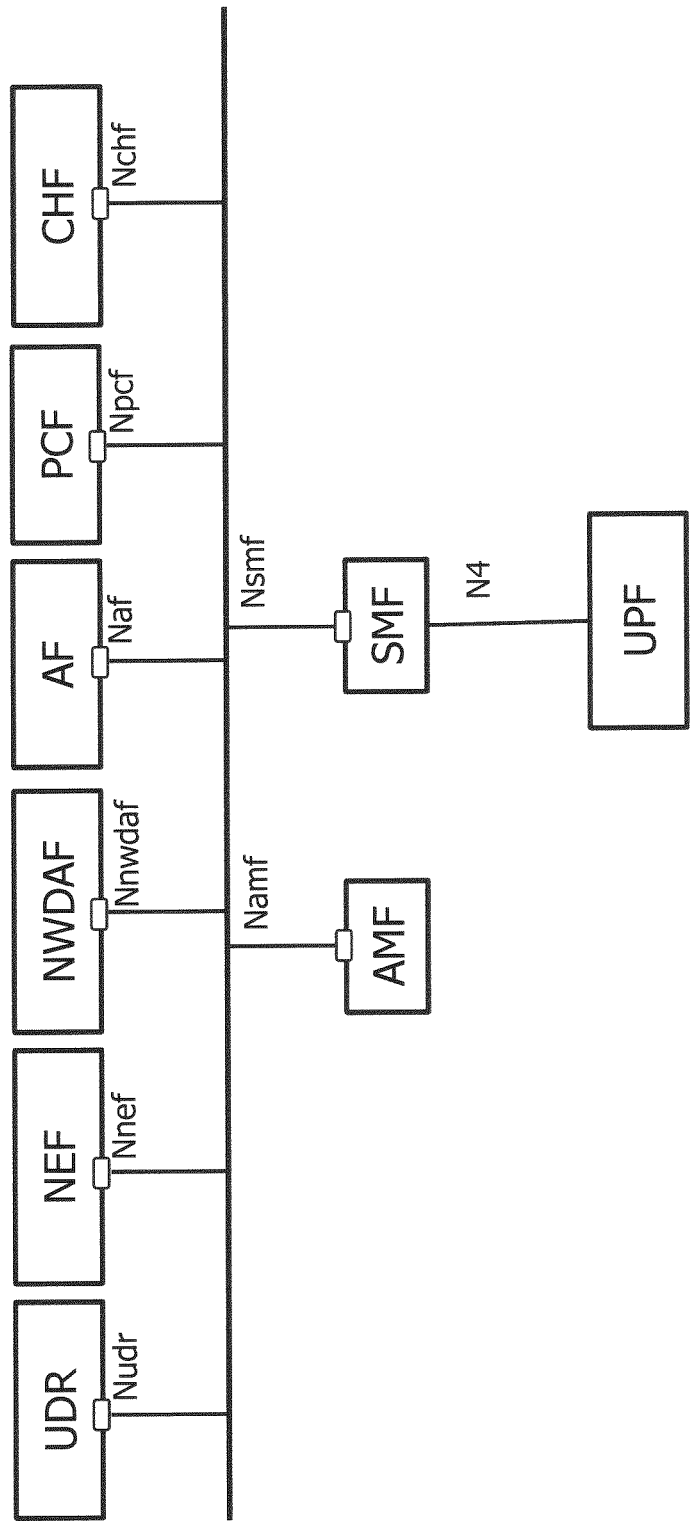

FIG. 13 depicts the 3GPP reference architecture for 5G, and FIG. 14. depicts the 3GPP 5GC architecture for policy, charging and analytics. Service Based Interfaces are represented in the format Nxyz and point to point interfaces in the format Nx.

NWDAF represents operator managed network analytics logical function. The NWDAF is part of the architecture specified in TS 23.501 and uses the mechanisms and interfaces specified for 5GC and OAM. The NWDAF interacts with different entities for different purposes:

- Data collection based on event subscription, provided by AMF, SMF, PCF, UDM, AF (directly or via NEF), and OAM;

Retrieval of information from data repositories (e.g. UDR via UDM for subscriber-related information);

Retrieval of information about NFs (e.g. NRF for NF-related information, and NSSF for slice-related information);

On demand provision of analytics to consumers.

Figure 15:
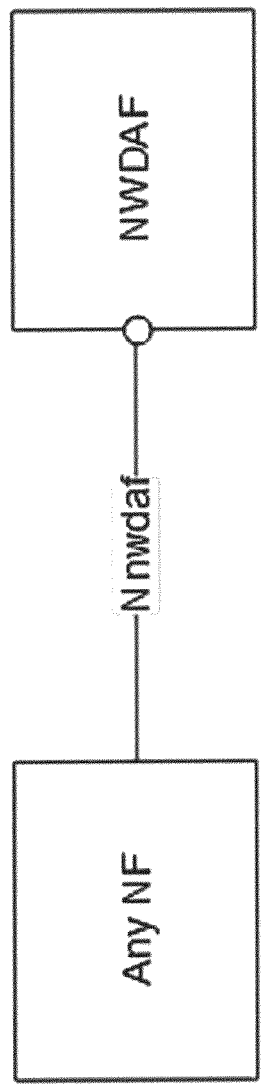

A single instance or multiple instances of NWDAF may be deployed in a PLMN. In case multiple NWDAF instances are deployed, the architecture supports deploying the NWDAF as a central NF, as a collection of distributed NFs, or as a combination of both. When multiple NWDAFs exist, not all of them need to be able to provide the same type of analytics results, i.e., some of them can be specialized in providing certain types of analytics. An Analytics ID information element is used to identify the type of supported analytics that NWDAF can generate. NWDAF instance(s) can be collocated with a 5GS NF. See also FIG. 15.

Problems with existing solutions comprise the following. UPF classifies traffic using the so-called PFDs (Packet Flow Descriptor), which are stored in UDR within the DataSet "Application Data" and retrieved by SMF at PDU session establishment. Then, SMF installs the PFDs in UPF. When UPF detects and classifies a new traffic flow (i.e. the first time UPF detects traffic matching the rules in a certain PFD for a certain user and application), it reserves a certain amount of memory resources to be used for the processes that handle that flow. Traffic flows are limited in time. For example, one flow can be a user downloading a video, or a web page request to a certain URL, etc. For this reason, UPF frees the resources allocated to a certain flow after a certain time of inactivity. The current approach is that this flow time-out value is preconfigured in UPF and usually spans between tens or hundreds of seconds. The reason for this flow time-out is because allocating and releasing resources is resource consuming, so maintaining the resource allocation during a certain time after the flow traffic stops, enables to have the resources already allocated if there is flow activity again after some time. The main problem of this solution is that it is not resource-efficient due to the following reasons. First, for small flows that only happen once (e.g. IoT traffic, background application notifications, etc.), the memory resources allocated by UPF are not used most of the time they are reserved for the flow. So, these resources are basically unutilized while they are reserved. Second, the same happens for flows that present intermittent or periodic activity with a period greater than the configured flow time-out value. The resources allocated to these flows while they are inactive are unutilized. Third, some flows may require enforcements in UPF that need more time than usual (e.g. introducing information for header content enrichment of encrypted traffic). This time is not considered when setting the flow time-out and may lead to undesirable memory releases.

Following description proposes a solution to address the above problems based on analytics (NWDAF). The solution is based on the following novel features:

1) NWDAF produces flow activity patterns for App-IDs.
    The flow activity analytics for an App-ID in NWDAF can be activated by SMF (request/response or subscribe/notify operations) or OAM.
    NWDAF collects traffic information from UPF or OAM.
    NWDAF uses the PFDs of the App-ID to identify the application traffic and analyze the data collected from UPF
    NWDAF detects the flow activity pattern of the application and:
        stores the flow activity pattern information in UDR along with the PFD information for the App-ID and in case the SMF (or other NF) is subscribed to the activity patterns of the App-ID, NWDAF sends a notification including the pattern to the subscribed NFs.

2) The flow activity pattern is sent to UPF via the PFD management procedure, so that UPF can set an optimal flow time-out value on a per App-ID basis.
    At PDU session establishment SMF gets the PCC rules from PCF and gets from UDR (via NEF) the PDRs for the App-IDs in the PCC rules.
    The PDRs include the Flow-activity-pattern and flow-activity-pattern-metadata
    SMF installs the PDRs including the Flow-activity-pattern and flow-activity-pattern-metadata in UPF
    When UPF allocates memory to a new flow of an App-ID, it sets an optimal flow time-out value based on the flow-activity-pattern for the App-ID.

Advantages of the proposed solution comprise one or more of the following, depending on the implementation. First, it allows an optimal allocation of memory resources in UPF to application flows minimizing the unused allocated memory to idle flows. Second, it allows to maximize the number of flows a UPF can handle, since the memory allocated to inactive flows is minimized. Third, it allows to maintain the memory allocation to flows that require avoiding memory releases when executing certain enforcements (e.g. header enrichment of encrypted traffic)

What follows is a detailed description of the proposed solution.

Figure 16:
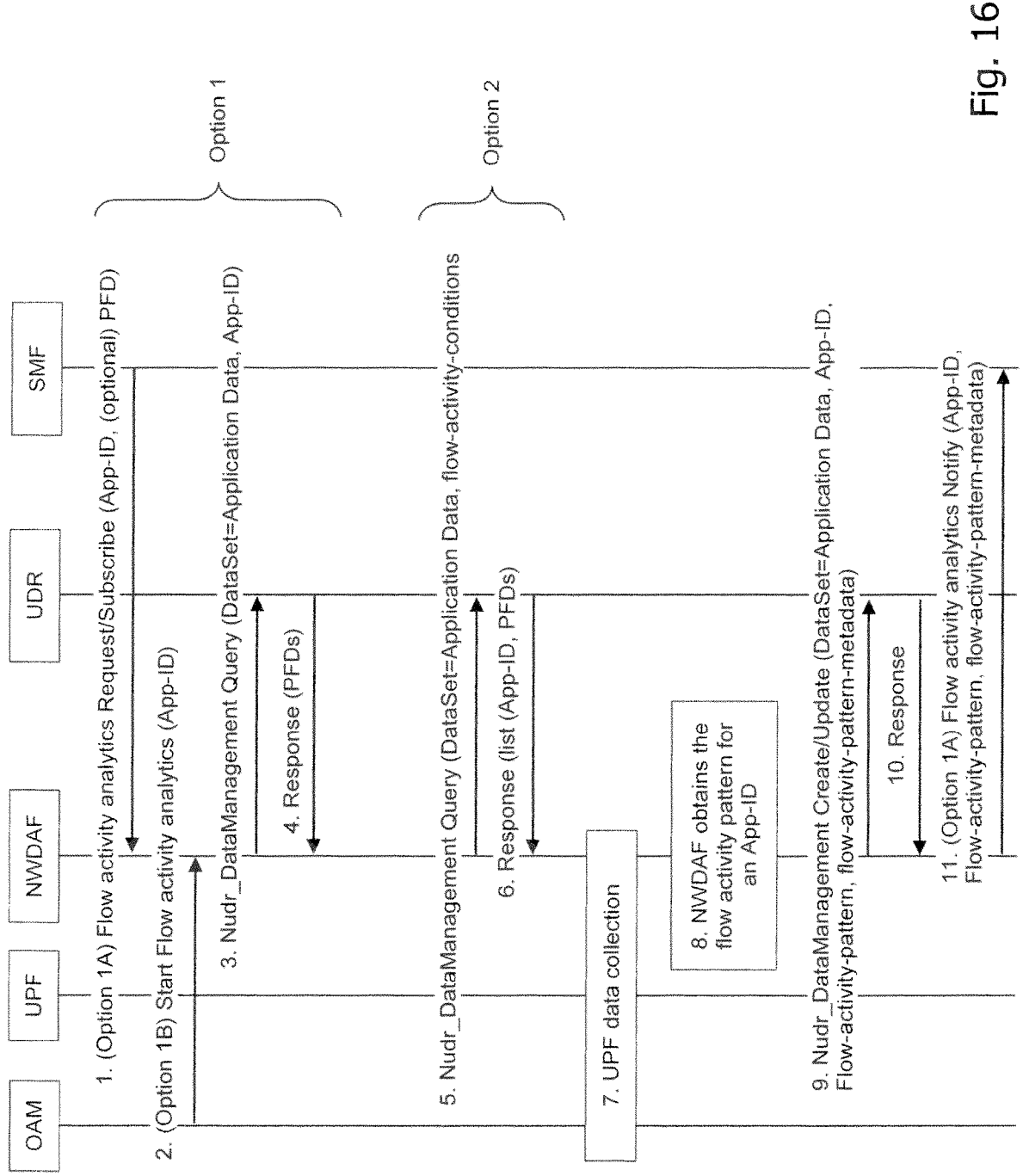

FIG. 16 shows the process in which the flow activity patterns are obtained by NWDAF. To activate the flow activity analytics two mechanisms are proposed:

(Option 1A) SMF requests or subscribes to flow activity analytics in NWDAF; and (Option 1B) OAM starts the analytics process in NWDAF for an App-ID.

We also propose a mechanism (Option 2) by which NWDAF proactively triggers the flow activity analytics processes.

1. (New message) (Option 1A) SMF requests or subscribes to flow activity analytics in NWDAF, sending a Flow activity analytics Request/Subscribe message including:
    a. App-ID—the application whose flows are to be analyzed
    b. PFDs—The so-called Packet Flow Descriptors that include the traffic filters to classify the traffic into the App-ID
2. (New message) OAM commands to NWDAF the start of the flow activity analytics processes for an App-ID. OAM sends to NWDAF the target App-ID
3. (New message) In order to classify the traffic belonging to the App-IDs, NWDAF gathers the PFDs from UDR invoking Nudr_DataManagement Query service operation including:
    a. DataSet=Application Data—the dataset used in UDR to store the PFDs
    b. App-ID
4. (New message) UDR responds with the PFDs for the App-ID Note: Optionally, this message may include the flow-activity-pattern and flow-activity-pattern-metadata in the PFDs if available in UDR.

Figure 17:
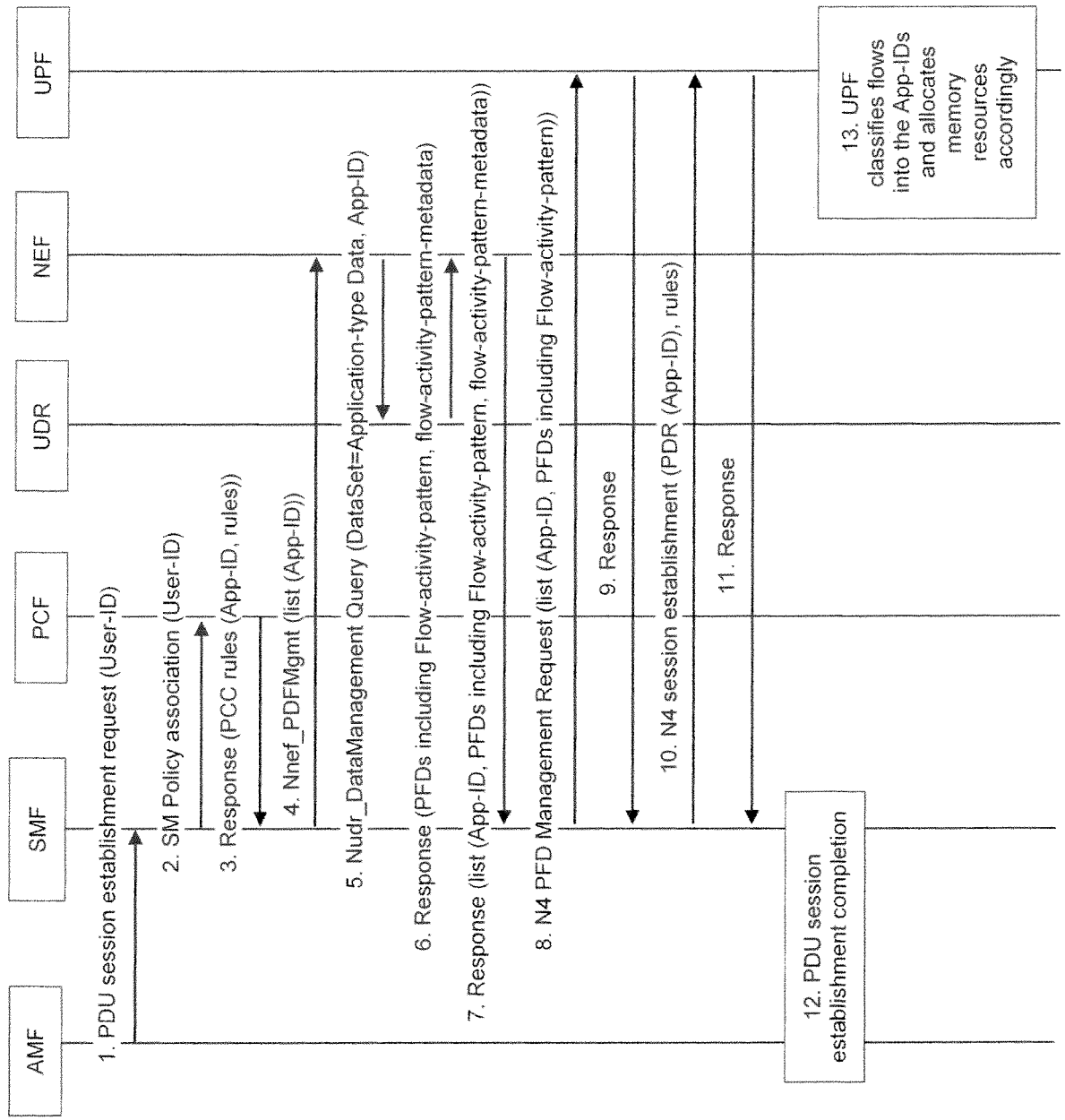

5. (Option 2) (New message) Another possibility is that NWDAF internally triggers the flow activity analytics processes, so to decide what App-IDs need an updated flow activity pattern, NWDAF invokes the Nudr_DataManagement Query service operation in UDR including:
   a. DataSet=Application Data
   b. Flow-activity-conditions—the conditions that the flow activity pattern needs to meet (e.g. the time when the last pattern was generated, etc.)
6. (New message) UDR responds with the list of App-IDs (along with their PFDs) that meet the above conditions.
Note: Optionally, this message may include the flow-activity-pattern and flow-activity-pattern-metadata in the PFDs if available in UDR.
7. NWDAF collects the necessary traffic data from UPF. We assume this is done following the standard mechanisms.
8. NWDAF detects a new flow activity pattern for an App-ID
9. (New message) NWDAF stores the flow activity pattern information in UDR invoking the Nudr_DataManagement Create/Update service operation including:
   a. DataSet=Application Data
   b. App-ID
   c. Flow activity pattern—It can be e.g. a binary (e.g. a ML model), a parametrization (e.g. a probability distribution of the flow activity over time), etc.
   d. Flow activity pattern metadata—Metadata of the pattern, e.g. time when it was obtained, format of the pattern (ML model, probability distribution, etc.), etc.
10. UDR acks the pattern registration
11. (Optional) (New message) If SMF (or any other NF) subscribed to flow activity analytics, NWDAF sends a Flow activity analytics Notify message including:
   a. App-ID
   b. Flow-activity-pattern
   c. flow-activity-pattern-metadata FIG. 17 shows the PDU session establishment process and the provisioning of the PFDs including the Flow-activity-pattern to UPF.
1. AMF sends a PDU session establishment request to SMF including the User-ID
2. SMF requests the SM policy association to PCF including the User-ID
3. PCF responds with the PCC rules for the user. PCF includes rules per App-ID.
4. In order to get the traffic filters to send to UPF, SMF invokes the PFD management service in NEF for the App-IDs.
5. NEF invokes the Nudr_DataManagement Query service operation in UDR including:
   a. DataSet=Application Data
   b. App-ID
6. UDR sends the PFDs to NEF
   a. (New parameter) The PFDs include the Flow-activity-pattern and flow-activity-pattern-metadata
7. NEF responds to SMF including:
   a. (New param.) A list of tuples, each tuple including (App-ID, PFDs including Flow-activity-pattern and flow-activity-pattern-metadata)
Note: SMF can use the flow-activity-pattern-metadata information to trigger the flow activity analytics in NWDAF, e.g. when a flow activity pattern was obtained a long time ago.
8. SMF triggers N4 PFD Management request towards UPF including:
   a. (New param.) A list of tuples, each tuple including (App-ID, PFDs including Flow-activity-pattern and optionally flow-activity-pattern-metadata)
Note: flow-activity-pattern-metadata is not needed in UPF, but it can use this information to better set the flow time-out value. E.g. based on the age of the pattern.
9. UPF acks the N4 PFD Management request
10. SMF establishes the N4 session for the user with UPF including the PDRs (Packet Detection Rules) and associated rules. In the PDRs the SMF includes the App-ID.
In this step the UPF sets the flow-time out value for the application flows based on the flow activity pattern. It may also consider the rules received in this step (e.g. a certain QoS rule may have implications in the flow time-out value, for example low latency requirements may demand to have the flow resources already allocated whenever possible, thus implying a large flow time-out value).
11. UPF acks the N4 session establishment
12. The PDU session establishment process is completed
13. Now the UPF can use the provided flow activity patterns to optimally set the flow time-out values when it classifies flows into App-IDs and allocates memory resources for them.
Note: During the lifetime of a PDU session, the UPF can adjust the values of the flow time-outs for the different applications if necessary. E.g. based on the protocol used by the application, etc.

In the above, an technique to allow an optimal allocation of memory resources to application flows in UPF based on the flow activity pattern obtained by NWDAF.

ABBREVIATIONS

AF Application Function
AMF Access and Mobility Management Function
IE Information Element
ML Machine Learning
NEF Network Exposure Function
NWDAF Network Data Analytics Function
PCF Policy Control Function
PDU Protocol Data Unit
SMF Session Management Function
UDR Unified Data Repository
UPF User Plane Function

The invention claimed is:
1. A method of triggering transition control between different radio resource control (RRC) states of wireless terminal devices, the method comprising
   receiving a request for an RRC state transition control for a terminal device, wherein the request includes at least one identifier associated with the terminal device and wherein the request is received in the context of a current traffic activity of the terminal device;
   obtaining a temporal inactivity parameter associated with the at least one identifier, wherein the temporal inactivity parameter depends on an estimated period of time between two traffic activities of the terminal device; and
   triggering, based on the temporal inactivity parameter or a parameter derived on the basis of the temporal inactivity parameter, the RRC state transition control for the terminal device, wherein the RRC state transition control is triggered in anticipation of a next traffic activity of the terminal device, and wherein the temporal inactivity parameter or the parameter derived on the basis of the temporal inactivity parameter depends on an estimated period of time between the current traffic activity and immediately next traffic activity of the terminal device.

2. The method of claim 1, wherein
the temporal inactivity parameter, or the parameter derived on the basis of the temporal inactivity parameter, is indicative of the estimated period of time between end of the current traffic activity and start of the immediately next traffic activity, plus a temporal safety margin.

3. The method of claim 1, wherein
the RRC state transition control is performed for a transition from a first RRC state associated with a higher power consumption level to a second RRC state associated with a lower power consumption level.

4. The method of claim 1, wherein triggering the RRC state transition control comprises controlling setting of an RRC state transition timing mechanism for the terminal device based on the temporal inactivity parameter, or the parameter derived on the basis of the temporal inactivity parameter, wherein the RRC state transition timing mechanism governs a transition from the first RRC state to the second RRC state.

5. The method of claim 1, wherein
triggering the RRC state transition control comprises transmitting the temporal inactivity parameter, or the parameter derived on the basis of the temporal inactivity parameter, to a network node in charge of performing the RRC state transition control.

6. The method of claim 1, wherein
the parameter derived on the basis of the temporal inactivity parameter is obtained by modifying the temporal inactivity parameter taking into account one or more of the following constraints: regularly occurring traffic activities per at least one identifier, network signaling costs, network load, terminal device type, current RRC state of the terminal device, target RRC state of the terminal device, mobility of the terminal device.

7. The method of claim 1, wherein said triggering is based on the parameter derived on the basis of the temporal inactivity parameter, the method further comprising analyzing the temporal activity parameter compared to one or more alternative parameters using a cost function and deriving the parameter derived on the basis of the temporal inactivity parameter as a result of the cost function analysis.

8. The method of claim 1, wherein
the request further includes auxiliary information associated with a current traffic activity of the terminal device, and wherein inactivity parameter is also determined based on the auxiliary information, and wherein the auxiliary information includes at least one parameter selected from the parameter group comprising time of the day, day of the week, date, terminal device type, geographic location associated with the terminal device.

9. The method of claim 1, wherein
determining the temporal inactivity parameter comprises accessing an inactivity pattern database to obtain, based at least on the at least one identifier, the temporal inactivity parameter, wherein the inactivity pattern database is configured to enable selection among different temporal inactivity parameters stored for the at least one identifier dependent on the auxiliary information.

10. A method of determining temporal inactivity parameters for controlling transitions between different radio resource control (RRC) states of wireless terminal devices, the method comprising
obtaining activity data sets for individual traffic activities of a plurality of terminal devices, wherein each activity data set includes, or permits derivation of, at least the following parameters:
a time stamp of the traffic activity;
a duration of the traffic activity; and
at least one identifier associated with the terminal device for which the activity data set has been created;
analyzing the activity data sets to determine a temporal inactivity pattern per at least one identifier, wherein the inactivity pattern comprises at least one temporal inactivity parameter that depends on an estimated period of time between two traffic activities of the terminal device; and
storing the inactivity pattern per at least one identifier in an inactivity pattern database to be accessible per the at least one identifier for RRC state transition control.

11. The method of claim 10, wherein
the activity data sets have been generated from traffic activities in the form of end-to-end communication sessions involving the plurality of terminal devices.

12. The method of claim 10, wherein
the temporal inactivity parameter depends on an estimated period of time between end of one traffic activity and start of the immediately next traffic activity.

13. The method of claim 10, wherein
at least some of the activity records further include auxiliary information in the form of at least one parameter selected from the parameter group comprising time of the day, day of the week, date, terminal device type, geographic location associated with the terminal device.

14. The method of claim 13, wherein
the inactivity pattern per at least one identifier comprises multiple temporal inactivity parameters associated with different auxiliary information parameters.

15. The method of claim 14, comprising
comparing an actual period of time between two traffic activities of a particular terminal device with an estimated period of time as defined by the temporal inactivity parameter, or a parameter derived on the basis of the temporal inactivity parameter, as determined for the associated RRC state transition control for the particular terminal device; and
modifying the associated temporal inactivity pattern based on a result of the comparison.

16. The method of claim 10, wherein
the activity data sets are continuously obtained and analyzed in an operational phase of a communication network comprising the terminal devices.

17. The method of claim 10, wherein
analyzing the activity data sets to determine the temporal inactivity pattern per at least one identifier comprises accumulating a distribution of inactivity times per at least one identifier and determining the at least one temporal inactivity parameter per at least one identifier from the resulting distribution.

18. An apparatus for triggering transition control between different radio resource control (RRC) states of wireless terminal devices, the apparatus comprising:
a processor; and memory operatively coupled to the processor and comprising program code configured to control operation of the processor such that the apparatus is configured to:

receive a request for an RRC state transition control for a terminal device, wherein the request includes at least one identifier associated with the terminal device;

obtain a temporal inactivity parameter associated with the at least one identifier, wherein the temporal inactivity parameter depends on an estimated period of time between two traffic activities of the terminal device; and trigger, based on the temporal inactivity parameter or a parameter derived on the basis of the temporal inactivity parameter, the RRC state transition control for the terminal device.

* * * * *